United States Patent
Mullins et al.

(10) Patent No.: US 10,050,953 B2
(45) Date of Patent: Aug. 14, 2018

(54) EXTENDING A FEDERATED GRAPH WITH THIRD-PARTY DATA AND METADATA

(71) Applicant: Microsoft Technology Licensing, LLC, Redmond, WA (US)

(72) Inventors: Christopher Lee Mullins, Sammamish, WA (US); John Peter Shewchuk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 14/954,539

(22) Filed: Nov. 30, 2015

(65) Prior Publication Data
US 2017/0155658 A1    Jun. 1, 2017

(51) Int. Cl.
*H04L 29/06* (2006.01)
*G06F 21/33* (2013.01)

(52) U.S. Cl.
CPC .......... *H04L 63/0807* (2013.01); *G06F 21/33* (2013.01)

(58) Field of Classification Search
CPC ...... H04L 29/06; H04L 63/0807; G06F 21/33
USPC .......................................................... 726/9
See application file for complete search history.

(56) References Cited

U.S. PATENT DOCUMENTS

| 7,200,657 B2 | 4/2007 | Adams et al. |
| 7,346,923 B2 | 3/2008 | Atkins et al. |
| 7,657,639 B2 | 2/2010 | Hinton |
| 7,735,117 B2 | 6/2010 | Nadalin et al. |
| 7,810,136 B2 | 10/2010 | Guo et al. |
| 8,369,875 B1 | 2/2013 | Lee et al. |

(Continued)

FOREIGN PATENT DOCUMENTS

EP    2230595    9/2010

OTHER PUBLICATIONS

Web article: "What is Application Access and Single Sign-On with Azure Active Directory" published by GitHub, 2015, [online][retrieved on Sep. 10, 2015] available at: https://github.com/Azure/azure-content/blob/master/articles/active-directory/active-directory-appssoaccess/whatis.md#using-the-azure-ad-application- . . . , 9 pages.

(Continued)

*Primary Examiner* — Kambiz Zand
*Assistant Examiner* — Aubrey Wyszynski
(74) *Attorney, Agent, or Firm* — Goff IP Law, PLLC; Jared S. Goff

(57) ABSTRACT

Technologies are described herein for extending a federated graph with third-party data or metadata. A federated facet provider service registers with a federated graph provider service as a provider of a facet for a resource in a graph. For example, the federated facet provider service can provide a callback uniform resource locator ("URL") or a uniform resource identifier ("URI") template for resolving the callback URL. When the federated graph provider service receives a request for a facet from a service client, the federated graph provider service determines a callback network address for the federated facet provider service and obtains an authentication token for the federated facet provider service. A response is provided to the service client that causes the service client to redirect to the federated facet provider service to obtain the requested facet utilizing the authentication token. The federated facet provider service provides the requested facet directly to the service client.

20 Claims, 13 Drawing Sheets

(56) References Cited

U.S. PATENT DOCUMENTS

| | | | |
|---|---|---|---|
| 8,886,817 B2 | 11/2014 | Ting et al. | |
| 8,965,957 B2 | 2/2015 | Barras | |
| 8,990,167 B2 | 3/2015 | Noor | |
| 9,003,505 B2 | 4/2015 | Brown et al. | |
| 2003/0154403 A1 | 8/2003 | Keinsley et al. | |
| 2010/0153862 A1* | 6/2010 | Schreiber | G06F 9/4448 715/760 |
| 2013/0086210 A1* | 4/2013 | Yiu | G06F 21/41 709/217 |
| 2013/0086670 A1* | 4/2013 | Vangpat | H04L 9/3213 726/8 |
| 2013/0091204 A1 | 4/2013 | Loh et al. | |

OTHER PUBLICATIONS

Web article: Dixon, Chris, "The Next Webolution: Federated and Extensible Web Services", published by Business Insider, Sep. 7, 2010, [online][retrieved on Sep. 9, 2015] available at: http://www.businessinsider.com/in-the-future-web-services-should-be-both-federated-and-extensible-2010-9?IR=T, 3 pages.

Web article: "Faceted Search" published by Google, 2015 [online][retrieved on Sep. 10, 2015] available at: https://cloud.google.com/appengine/docs/java/search/faceted_search, 10 pages.

Web article: Gamby, Randall, "How to Log in to Multiple Servers with Federated Single Sign-On (SSO)" published by TechTarget, 2015 [online][retrieved on Sep. 10, 2015] available at: http://searchsecurity.techtarget.comianswer/How-to-log-in-to-multiple-servers-with-federated-single-sign-on-SSO, 5 pages.

Haas, et al., "The IBM Research Accelerated Discovery Lab", published Jun. 2014, Journal of ACM SIGMOD Record, vol. 43, Issue 2, 8 pages.

Web article: Hari, KT, "Integrating with Facebook Graph API", published by Sitepoint, 2015 [online][retrieved on Sep. 17, 2015] available at: http://www.sitepoint.com/integrating-with-facebook/, 8 pages.

Lieberman et al., "Parasol: An Architecture for Cross-Cloud Federated Graph Querying"; published Jun. 22, 2014, Proceedings of Workshop on Data Analytics in the Cloud; 4 pages.

Web article: "Multi-Tenant Cloud Application for Windows Azure Active Directory", published by Microsoft, 2015 [online][retrieved on Sep. 9, 2015] available at: https://code.msdn.microsoft.com/Multi-Tenant-Cloud-8015b84b, 2 pages.

Web article: Valkanas, et al., "A Faceted Crawler for the Twitter Service", published by insight-ict.eu, 2014 [online][retrieved on: Nov. 30, 2015] available at: http://www.insight-ict.eu/sites/default/files/publications/facetcrawl_wise2014.pdf, 10 pages.

International Search Report and Written Opinion issued in PCT Application No. PCT/US2016/062642, dated Feb. 1, 2017, 10 pages.

International Preliminary Report on Patentability, dated Sep. 8, 2017, in International Application No. PCT/US/2016/062642, International Filing Date Nov. 18, 2016, 6 Pages. (Note that the transmittal of this report in an international application is being considered to be "a communication from a foreign patent office in a counterpart foreign application" for the certification below.).

* cited by examiner

QUERYING FOR FACETS AND
OBTAINING INFORMATION ABOUT A FACET PROVIDER

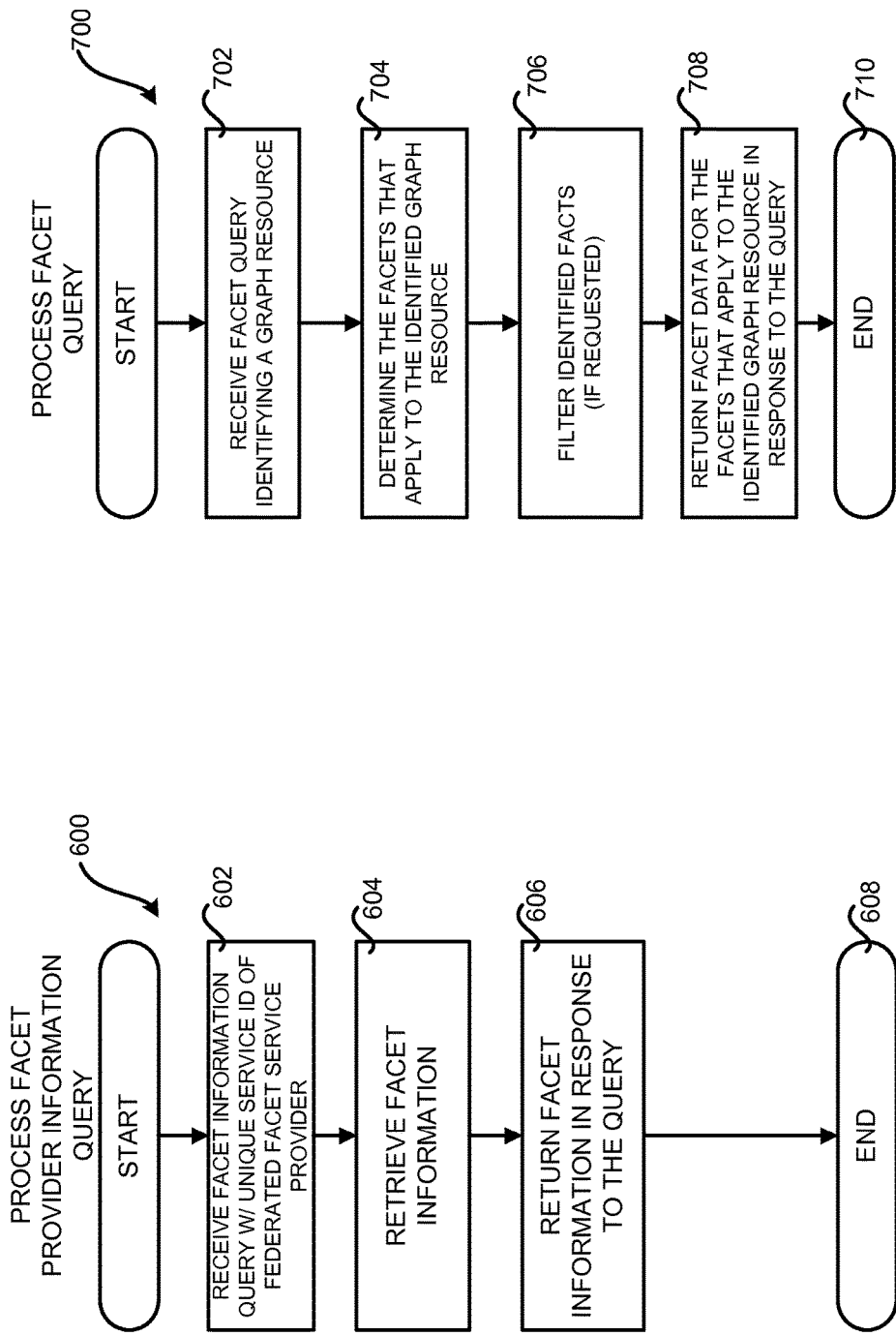

EXTENDING A FEDERATED GRAPH WITH THIRD-PARTY DATA AND METADATA

BACKGROUND

Computing systems currently exist that provide a unified interface for accessing information provided by a multitude of data providers. For example, a network service can provide a unified network service application programming interface ("API"), such as a unified web service API, that exposes related data that is mastered by a multitude of other federated data providers, such as other network services operated by the same entity.

When a request is received at such an API, the requested data is obtained from the other federated data providers, combined, and provided as a single unified response to the request. Through the implementation of a unified API for accessing data in this manner, a single request can conveniently be made to obtain data from many different federated data providers. The collection of content available from the various data providers in such a system is commonly referred to as a "property graph," or more simply, a "graph." One example is the MICROSOFT GRAPH, provided by MICROSOFT CORPORATION, which is currently accessible at graph.microsoft.com.

Systems for providing access to such a graph frequently utilize an "owner+decorator" model, wherein a given resource or entity in the graph is mastered by a single network service and "decorated" with additional data by other federated network services operated by the same entity. For instance, one network service may be utilized to master certain information about network users. Other federated "decorator" network services can also be utilized to "decorate" the user information with additional information regarding the network users.

Systems utilizing the "owner+decorator" model for providing unified access to a property graph tend to work well with a relatively low number of "decorator" network services. The "owner+decorator" model, however, can break down when large numbers (e.g. hundreds or thousands) of "decorator" network services are utilized. Consequently, third-parties (i.e. parties other than the provider or consumer of a property graph) are typically not permitted to integrate their network services as "decorators" of data in such a graph.

As mentioned briefly above, the various network services (e.g. a "master" network service and the various "decorator" network services) utilized to implement an "owner+decorator" model for providing access to a property graph are typically operated by the same entity. Third-party providers of "decorator" network services can be very reluctant to federate their network services with such an entity due to network security concerns. For example, a third-party provider of a "decorator" network service might not want to compromise the security of its data by providing the data to the entity operating the various network services that implement the "owner+decorator" model.

It is with respect to these and other considerations that the disclosure made herein is presented.

SUMMARY

Technologies are described herein for extending a federated graph with third-party data and metadata. Through an implementation of the technologies disclosed herein, an arbitrarily large number of third-party-provided "decorator" network services can be utilized to decorate data contained in a property graph that is accessible through a unified network service API. Moreover, an implementation of the technologies disclosed herein can enable third-party "decorator" network services to be integrated with a federated graph in a manner that does not compromise the security or sovereignty of data maintained by the third-party. Technical benefits other than those specifically identified herein can also be realized through an implementation of the disclosed technologies.

According to one configuration disclosed herein, a network service, which is referred to herein as a "federated graph provider service," provides functionality for exposing a unified network service API for accessing data in a graph. For example, and without limitation, the federated graph provider service can expose a web service API through which service clients can obtain data from the graph. In response to a request for data, the federated graph provider service can obtain and combine data from numerous other federated data providers, such as "decorator" network services operated by the same entity that operates the federated graph provider service.

The federated graph provider service can also provide functionality for integrating with third-party-provided "decorator" network services, which are referred to herein as "federated facet provider services" or, more generally, "facet provider services." As discussed briefly above, the federated graph provider service can integrate with the federated facet provider services in a manner that permits an arbitrarily large number of federated facet provider services to be utilized, and in a manner that does not compromise the security or sovereignty of the data maintained by the federated facet provider services.

In order to enable this functionality, the federated facet provider services first register with the federated graph provider service as a provider for a particular facet. For instance, in the example described above wherein the graph maintains data about users, a facet can be any arbitrary information about a user identified in the graph, such as a user's shoe or hat size. A facet can be associated with a resource in the graph through data or metadata associated with a federated facet provider service and the federated graph provider service.

The federated facet provider services are operated in networks (which might be referred to herein as a "facet provider network") that are different than the network in which the federated graph provider service operates (which might be referred to herein as a "graph provider network"). Additionally, the entity that operates the federated graph provider service and the entities that operate the federated facet provider services have a federated relationship. Through this relationship, the entity that operates the federated graph provider service can issue authentication tokens that permit users to access the federated facet provider services in some configurations. Additional details regarding this mechanism are discussed below.

In one particular configuration, a federated facet provider service registers with the federated graph provider service as a facet provider by providing a unique service identifier ("ID") associated with the federated facet provider service and a callback network address, such as a uniform resource locator ("URL"), for the federated facet provider service. This registration mechanism might be referred to herein as "basic registration."

In another configuration, a federated facet provider service registers with the federated graph provider service as a facet provider by providing a unique service ID associated with the federated facet provider service and a uniform resource identifier ("URI") template. As will be discussed in greater detail below, the URI template can be utilized to resolve a callback URL for retrieving a requested facet from the federated facet provider service at query time. This registration mechanism might be referred to herein as "advanced registration."

Once a federated facet provider service has registered with the federated graph provider service, that facet provider service can be utilized as a data provider for a particular facet. For example, in one configuration, the federated graph provider service receives a request from a service client for a facet of a resource in the graph. As mentioned above, such a request can be received via a network service API, such as a web service API. The request includes data identifying a location in the graph of the resource and the unique ID associated with the federated facet provider service that provides the facet.

In response to receiving such a request, the federated graph provider service identifies the network address of the network service API (e.g. the web service) exposed by the federated facet provider service registered with the federated graph provider service to provide the facet. For example, when the basic registration mechanism described above has been utilized, the federated graph provider service can utilize the unique ID associated with the federated facet provider service to retrieve a previously stored callback URL for the federated facet provider service.

When the advanced registration mechanism described above has been utilized, the federated graph provider service can utilize the unique ID associated with the federated facet provider service to obtain the URI template for the federated facet provider service. The federated graph provider service can then resolve the URI template to generate the network address of the network service API (e.g. web service API) exposed by the federated facet provider service for obtaining the requested facet.

The federated graph provider service also obtains an authentication token that can be utilized by the requesting service client to authenticate with the federated facet provider service. As discussed briefly above, the federated graph provider service and the federated facet provider service have a federated relationship and, consequently, the federated graph provider service is authorized to generate or otherwise obtain authentication tokens that service clients can utilize to authenticate with the federated facet provider service.

In one configuration, the federated graph provider service provides a response to the request received from the service client that instructs the service client to perform a redirect to the network address of the network service API exposed by the federated facet provider service to obtain the facet. The response also includes the authentication token, which the service client can utilize to authenticate with the federated facet provider service. The service client, in turn, redirects its request to the federated facet provider service and includes the authentication token provided by the federated graph provider service with the request. The federated facet provider service receives the request, validates the authentication token and, if validated, provides the requested facet to the service client.

In another configuration, the federated graph provider service is configured to utilize the callback URL of the federated facet provider service and the authentication token to obtain the requested facet from the federated facet provider service itself. In this configuration, the federated graph provider service retrieves the requested facet from the federated facet provider service and returns the facet to the service client directly. In this configuration, no redirection of the service client to the federated facet provider service is required, thereby enabling the retrieval of the requested facet to be performed more quickly but at the cost of the loss of data sovereignty. Additionally, in this configuration the federated graph provider service can also provide other information associated with the graph resource that is obtained from the federated network services within the graph provider network in response to such a request.

In some configurations, the federated graph provider service exposes a network service API (e.g. a web service API) through which callers can obtain information about a facet. For example, the federated graph provider service can receive a request for information about a facet that includes the unique service ID of a registered federated facet provider service. The federated graph provider service can utilize the unique ID associated with the federated facet provider service to obtain the requested information about the facet. The requested information about the facet can then be returned in response to the request for information. The information about the facet can include, but is not limited to, the unique service ID associated with the federated facet provider service, the name of the entity operating the federated facet provider service, a text description of the facet, and/or details regarding the authentication token used to authenticate with the federated facet provider service.

In some configurations, the federated graph provider service exposes a network service API (e.g. a web service API) through which callers can obtain data identifying the particular facets associated with a resource in the graph. For example, and without limitation, a request to such an API can identify a resource in the graph. In response thereto, the facets associated with the identified resource can be identified and information regarding the facets can be provided in reply to the request. This information might include, for example, the unique service ID associated with each facet, data that identifies the entity that operates the associated federated facet provider service, a text description of the facet, the callback URL for the associated federated facet provider service, and/or details regarding the authentication token used to authenticate with the federated facet provider service.

In some configurations, the federated graph provider service, the federated facet provider service, and the service client are located in different geographic locations. In one specific example, for instance, the federated graph provider service is located in the United States, the federated facet provider service is located in Germany, and the service client is located in France. In this example, the service client can utilize the mechanism described above to make a request for sensitive data that is not permitted to leave the borders of the European Union ("EU"). This request would be made to the federated graph provider service located in the United States, but would be redirected to the federated facet provider service located in Germany. The service client located in France can, therefore, retrieve the data from the federated facet provider service located in Germany without the data leaving the borders of the EU. As mentioned above, other technical benefits can be realized from an implementation of the technologies disclosed herein.

It should be appreciated that the above-described subject matter can be implemented as a computer-controlled apparatus, a computer process, a computing system, or as an article of manufacture such as a computer readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a flow diagram showing a routine that illustrates additional aspects of the mechanism shown in FIG. 5 for obtaining information about a facet provider, according to one configuration disclosed herein;

FIG. 7 is a flow diagram showing a routine that illustrates additional aspects of the mechanism shown in FIG. 5 for querying for facets, according to one configuration disclosed herein;

DETAILED DESCRIPTION

Figure 1:
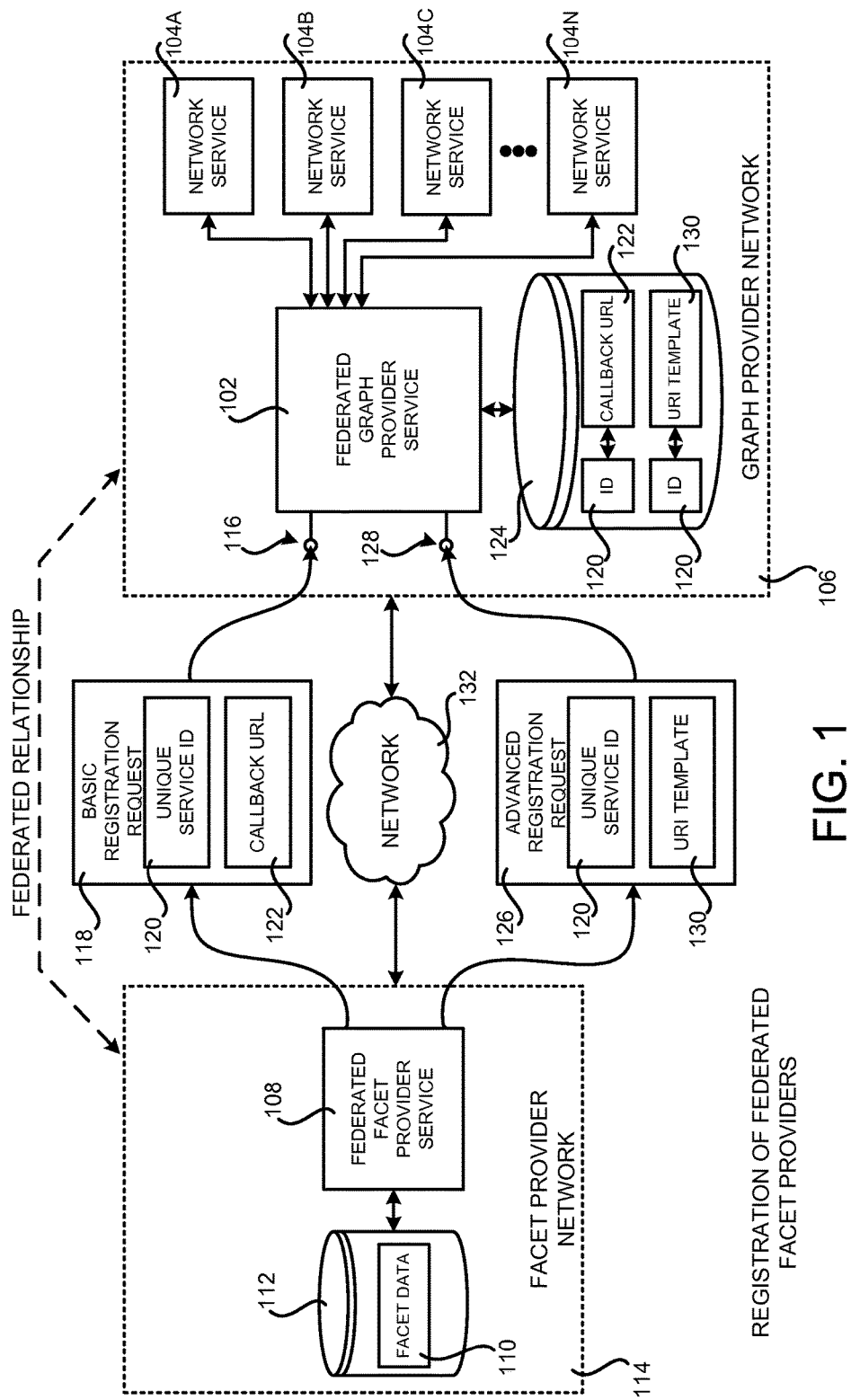
FIG. 1 is a network diagram showing aspects of several mechanisms for registering a federated facet provider service with a federated graph provider service, according to one configuration disclosed herein.

The following detailed description is directed to technologies for extending a federated graph with third-party data and metadata. As discussed briefly above, through an implementation of the technologies disclosed herein an arbitrarily large number of third-party-provided "decorator" network services can be utilized to decorate data contained in a property graph that is accessible through a unified network service API. An implementation of the technologies disclosed herein can also allow third-party "decorator" network services to be integrated with a property graph in a manner that does not compromise the security of the data maintained by the third-party. Other technical benefits can also be realized through an implementation of the technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration as specific configurations or examples. Referring now to the drawings, in which like numerals represent like elements throughout the several FIGS., aspects of various technologies for extending a federated graph with third-party data and metadata will be described.

FIG. 1 is a network diagram showing aspects of several mechanisms for registering a federated facet provider service 108 with a federated graph provider service 102, according to one configuration disclosed herein. As discussed briefly above, the federated graph provider service 102 is a network service that provides functionality for exposing a unified network service API (not shown in FIG. 1) for accessing data in a graph. For example, and without limitation, the federated graph provider service 102 can expose a web service API through which service clients (not shown in FIG. 1) can obtain data from the graph. In response to a request for data, the federated graph provider service 102 can obtain and combine data from numerous other federated data providers, such as "decorator" network services 104A-104N operated by the same entity that operates the federated graph provider service 102.

The graph provided by the federated graph provider service 102 can include data about various types of resources. For example, and without limitation, the graph can include data about enterprise resources, such as people and documents, as well as the relationships and interactions between the resources. The relationships and interactions can be represented as edges between nodes that identify the various resources. For example, the edges might indicate that a user has modified a document, that a user is working with another user, that certain resources are popular with other related users, organization structure, and/or other types of data. The various nodes and edges in the graph can be provided by the first-party network services 104A-104N.

As will be described in greater detail below, the federated graph provider service 102 can also provide functionality for integrating with third-party-provided "decorator" network services, such as the federated facet provider service 108. As discussed briefly above, the federated graph provider service 102 can integrate with the federated facet provider service 108 in a manner that permits an arbitrarily large number of federated facet provider services 108 to be utilized, and in a manner that does not compromise the security or sovereignty of the data maintained by the federated facet provider services 108. In this regard, it should be appreciated that while only a single federated facet provider service 108 has been illustrated in the FIGS., many more such services can also be utilized.

As shown in FIG. 1, the federated facet provider services 108 are operated in networks (e.g. the facet provider network 114) that are different than the network in which the federated graph provider service 102 operates (e.g. the graph provider network 106). Additionally, the entity that operates the federated graph provider service 102 and the entities that operate the federated facet provider services 108 have a federated relationship, whereby the entity that operates the federated graph provider service 102 can issue authentication tokens (not shown in FIG. 1) that permit access to the federated facet provider service 108. Additional details regarding this mechanism are discussed below.

As also shown in FIG. 1, the graph provider network 106 and the facet provider network 114 are interconnected by way of a network 132. The network 132 can be the Internet or another type of data communications network. In this regard, it should be appreciated that many more public and private networks than are shown in FIG. 1 can be utilized to interconnect the various components described herein in the disclosed configurations. Additional details regarding a distributed computing environment that can be utilized to implement aspects of the graph provider network 106 and the facet provider network 114 are provided below with regard to FIG. 11. Additional details regarding several computing systems that can be utilized to implement the federated graph provider service 102, the federated facet provider service 108, and a service client (not shown in FIG. 1) are provided below with regard to FIGS. 10 and 12.

In order to enable aspects of the functionality disclosed herein, the federated facet provider service 108 first registers with the federated graph provider service 102 as a provider for a particular facet of a resource in the graph. As discussed briefly above, a facet is data or metadata associated with a resource in the graph provided by the federated graph provider service 102. For instance, and as mentioned above, in the example described above wherein the graph maintains data about users, a facet can be any arbitrary information about a user identified in the graph, such as a user's shoe or hat size. The federated facet provider service 108 can store the facet data 110 (i.e. the facets) in an appropriate electronic data store 112.

In one particular configuration, a federated facet provider service 108 registers with the federated graph provider service 102 as a facet provider by transmitting a basic registration request 118 to a basic registration API 116 exposed by the federated graph provider service 102. The basic registration API 116 can be a network service API, such as a web service API, or another type of network-accessible API. The basic registration request 118 includes a unique service ID 120 that is unique to the federated facet provider service 108 and a callback network address, such as a callback URL 122 for the federated facet provider service 108. As mentioned above, this registration mechanism might be referred to herein as "basic registration."

In order to illustrate aspects of the functionality disclosed herein, a sample scenario will be utilized throughout this document. In the sample scenario, a company called Best-Boots, Inc. ("BestBoots") desires to extend user data mastered by one of the network services 104A-104N to include the boot size for each user. In this example, BestBoots implements a federated facet provider service 108 in an appropriate Internet-accessible network (i.e. the facet provider network 114) that is configured to store facet data 110 that describes the boot sizes of various users. In this example, the federated facet provider service 108 exposes a publicly accessible API through which the boot size for a particular user can be obtained.

In this specific example, the basic registration request 118 specifies that the unique service ID 120 for the federated facet provider service 108 operated by BestBoots is "https://bestboots.com/v1/BootPreferences." In this regard it should be appreciated that while a unique URL is utilized in this example as the unique service ID 120, other types of data unique to a federated facet provider service 108 can also be utilized. In this example, the basic registration request 118 also specifies a callback URL 122 of "https://bestboots-preferences.apigateway.serviceprovider.com." This is the network address of the web service API exposed by the federated facet provider service 108 for obtaining a requested facet, in this example the boot size of a particular user.

When utilizing the basic registration mechanism described above, the callback URL 122 will be called with the location of the original resource from the graph provided by the federated graph provider service 102 as a query parameter. For instance, calls to the callback URL 122 will come in the form of "https://<callback URL>?resource=<graph resource URI>." Additional details regarding the retrieval of a facet utilizing where basic registration has been performed in the manner described above will be presented below with regard to FIGS. 3A and 3B.

In another configuration, a federated facet provider service 108 registers with the federated graph provider service 102 as a facet provider by transmitting an advanced registration request 126 to an advanced registration API 128 exposed by the federated graph provider service 102. The advanced registration API 128 can also be a network service API, such as a web service API, or another type of network-accessible API. The advanced registration request 126 also includes a unique service ID 120 that is unique to the federated facet provider service 108. However, in this mechanism the advanced registration request 126 does not include an explicit callback URL 122. Rather, the advanced registration request includes a URI template 130, such as an RFC 6750 URI Template. As will be discussed in greater detail below, the federated graph provider service 102 can utilize the URI template 130 to resolve a callback URL for retrieving a requested facet from the federated facet provider service 108 at query time. This registration mechanism might be referred to herein as "advanced registration."

Returning to the BestBoots example mentioned above, the unique service ID 120 when advanced registration is performed can be "https://bestboots.com/v1/BootPreferences-Advanced." As in basic registration, the unique service ID 120 need not be in the form of a URL and can be expressed as another type of data that uniquely identifies the federated facet provider service. In this example, the URI template 130 may be in the form of https://bestboots-preferences.api-gateway.serviceprovider.com/{userPrincipalName}. In this example, the URI template 130 will be resolved to include the "userPrincipalName" (i.e. the username) appended to the URI as a segment. It should be appreciated that this example has been simplified and that many other fields can be supported by the federated graph provider service 102 for URI templating.

In response to receiving a call to the basic registration API 116, the federated graph provider service 102 stores the specified service ID 120 and the callback URL 122 in an appropriate data store 124. Similarly, in response to a call to the advanced registration API 128, the federated graph provider service 102 stores the service ID 120 and the URI template 130 in the data store 124. As will be discussed in detail below, this information can be utilized at query time to redirect a service client to the proper federated facet provider service 108 for a particular facet. Additional details regarding both the basic and advanced registration mechanisms will be provided below with regard to FIG. 2.

Figure 2:
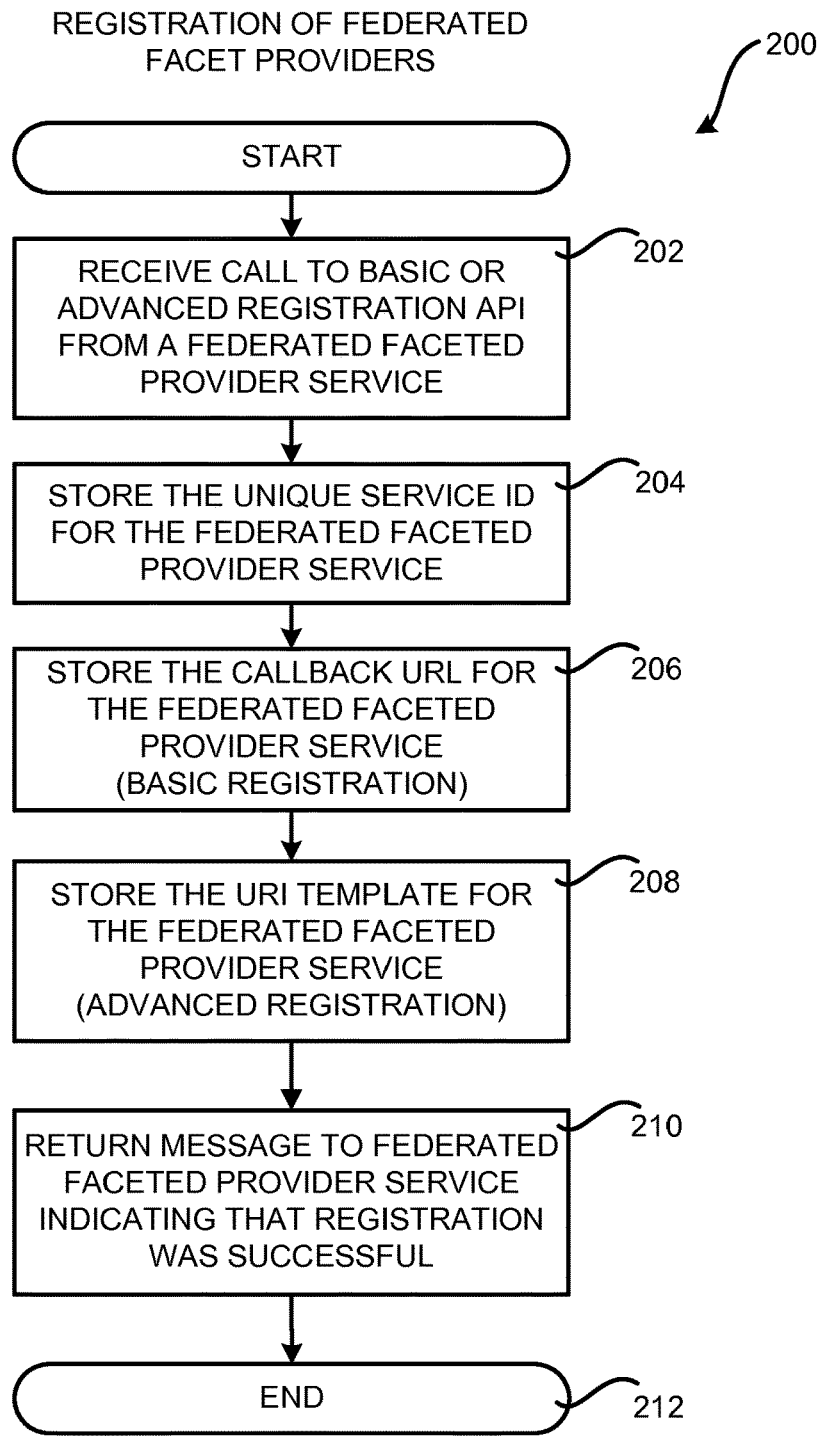
FIG. 2 is a flow diagram showing aspects of a routine that further illustrates the mechanism shown in FIG. 1 for registering a federated facet provider service with a federated graph provider service, according to one configuration disclosed herein.

FIG. 2 is a flow diagram showing aspects of a routine 200 that further illustrates the mechanism shown in FIG. 1 for registering a federated facet provider service 108 with a federated graph provider service 102, according to one configuration disclosed herein. It should be appreciated that the logical operations described herein with regard to FIG. 2 and the other FIGS. can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 200 begins at operation 202, where the federated graph provider service 102 receives a request 118 at the basic registration API 116 or a request 126 at the advanced registration API 128. In response to receiving either type of registration request, the routine 200 proceeds from operation 202 to operation 204, where the federated graph provider service 102 stores the specified unique service ID 120 in the data store 124. The routine 200 then proceeds from operation 204 to operation 206.

At operation 206, the federated graph provider service 102 stores the callback URL 122 for the federated facet provider service 108 if basic registration has been requested. If advanced registration has been requested, the federated graph provider service 102 stores the specified URI template 130 in the data store 124 at operation 208. The federated graph provider service 102 can then return a message to the federated facet provider service 108 at operation 210 indicating that registration was performed successfully. The routine 200 then proceeds from operation 210 to operation 212, where it ends.

Figure 3A:
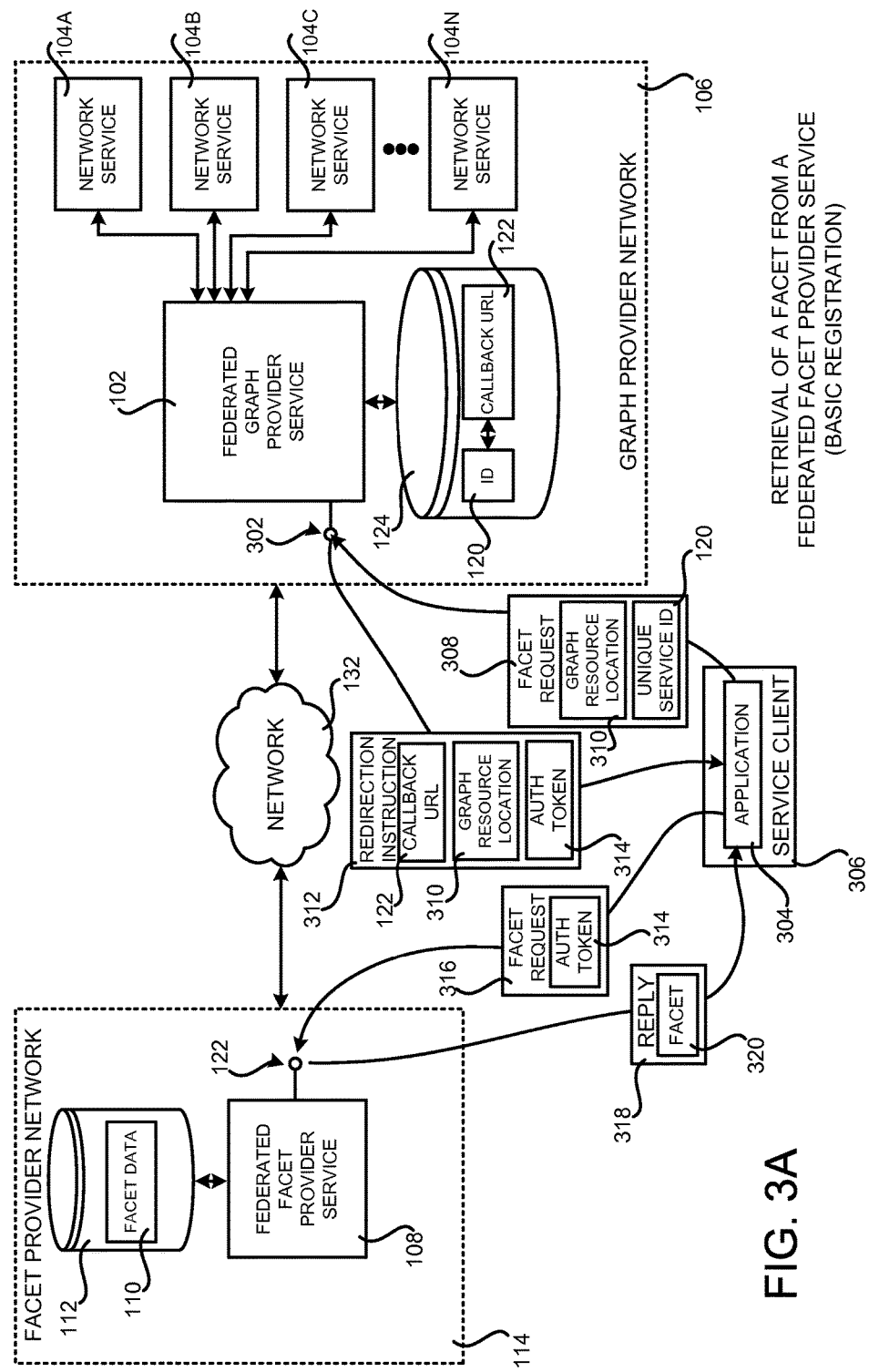
FIG. 3A is a network diagram showing aspects of a mechanism for retrieval of a facet from a federated facet provider service, according to one configuration disclosed herein.

FIG. 3A is a network diagram showing aspects of a mechanism for retrieval of a facet 320 from a federated facet provider service 108 in an example where basic registration has been performed in the manner described above, according to one configuration disclosed herein. As discussed briefly above, once a federated facet provider service 108 has registered with the federated graph provider service 102, the federated facet provider service 108 can be utilized as a data provider for a particular facet.

For example, in one configuration, the federated graph provider service 102 receives a request 308 for a facet (i.e. a "facet request") from an application 304 executing on a service client 306 for a facet of a resource in the graph. As mentioned above, such a request 308 can be received via a network service API, such as a web service API (shown in FIG. 3A as the graph retrieval API 302). The facet request 308 includes data identifying a location in the graph of the resource (shown in FIG. 3A as the graph resource location 310) and the unique service ID 120 associated with the federated facet provider service 108 that provides the requested facet.

In response to receiving a facet request 308, the federated graph provider service 102 identifies the network address of the network service API (e.g. the web service) exposed by the federated facet provider service 108 registered with the federated graph provider service 102 to provide the facet. For example, when the basic registration mechanism described above has been utilized, the federated graph provider service 102 can utilize the unique ID 120 associated with the federated facet provider service 108 to retrieve a previously stored callback URL 122 for the federated facet provider service 108 from the data store 124.

The federated graph provider service 102 also obtains an authentication token 314 that can be utilized by the requesting service client 306 to authenticate with the federated facet provider service 108. As discussed briefly above, the federated graph provider service 102 and the federated facet provider service 108 have a federated relationship and, consequently, the federated graph provider service 102 is authorized to generate or otherwise obtain an authentication token 314 that the service client can utilize to authenticate with the federated facet provider service 108. In one particular implementation, the authentication token 314 is an OAuth 2.0 bearer token that is obtained or generated by one of the network services 104A-104N. Other types of authentication tokens and mechanisms can, however, be utilized in other configurations.

In one configuration, the federated graph provider service 102 provides a response (shown in FIG. 3A as the redirection instruction 312) to the facet request 308 received from the service client 306 that instructs the service client 306 to perform a redirect to the callback URL 122 (i.e. the network address) of the network service API exposed by the federated facet provider service 108 to obtain the requested facet. In one particular configuration, the redirection instruction 312 is an HTTP/1.1 302 message that causes the application 304 executing on the service client 306 to redirect its request for the facet to the federated facet provider service 108. In this example, the HTTP message includes the callback URL 122 with the specified graph resource location 310 as a query parameter. Other mechanisms can also be utilized to cause the service client 306 to redirect its request to the federated facet provider service 108.

The response to the facet request 308 also includes the authentication token 314, which the service client 306 can utilize to authenticate with the federated facet provider service 108. The service client 306, in turn, redirects a request 316 to the federated facet provider service 108 and includes the authentication token 314 provided by the federated graph provider service 102 with the request 316. The federated facet provider service 122 receives the request 316, validates the included authentication token 314 and, if validated, provides the requested facet 320 to the service client 306 in a reply 318. The federated facet provider service 108 can identify the requested facet 320 utilizing the graph resource location 310 supplied with the facet request 316.

Turning back to the BestBoots example introduced above, in order to obtain a facet 320 identifying the boot size of a user with the identity of jsmith@contoso.com, the application 304 executing on the service client 306 can transmit an HTTP request (i.e. the facet request 308) to the federated graph provider service 102 in the form of "GET/contoso-.com/v1.0/users/jsmith@contoso.com/?facet=https://bestboots.com/V1/BootP references HTTP/1.1." In this example, the federated graph provider service 102 is operated by a company called Contoso, Inc. ("Contoso") and the graph retrieval API is located at graph.contoso.com.

In this example, the federated graph provider service 102 obtains the callback URL 122 for the BestBoots federated facet provider service 108 and an authentication token 314 ("abcdefg") for authenticating with the federated facet provider service 108. The federated graph provider service 102 then returns a response (i.e. the redirection instruction 312) to the service client 306 in the form of the following:

HTTP/1.1 302 Found
Location: https://bestboots-preferences.apigateway.serviceprovider.com?originalResource=graph.contoso.com/v1.0/users/jsmith@contoso.com
Authorization: Bearer abcdefg When the service client 306 receives the redirection instruction 312 from the federated graph provider service 102, the service client redirects its request to the callback URL 122 exposed by the federated facet provider service 108 using the following HTTP GET message:

GET https://bestboots-preferences.apigateway.serviceprovider.com?originalResource=graph.contoso.com/v1.0/users/jsmith@contoso.com HTTP/1.1
Accept: application/json
Authorization: Bearer abcdefg The federated facet provider service 108 then utilizes the graph resource location 310 to obtain the requested facet 320, and provides a reply 318 to the application 304 that includes the requested facet 320 in one configuration in the form of:

HTTP/1.1 200 OK
Content-Type: application/json
{
"facetId": "https://bestboots.com/v1/BootPreferences,"
"value":[{Boot size for user jsmith@contoso.com}]
}

When the application 304 receives the reply 318, including the facet 320, the application 304 may parse the reply 318 to obtain the facet 320. The facet 320 can then be utilized in various ways. In this regard, it should be appreciated that the service client 306 can repeatedly utilize the mechanism described above to obtain facets 320 from many different federated facet provider services 108. The facets 320 obtained from the various federated facet provider services 108 can then be combined and utilized by the application 304 in various ways. Additional details regarding the retrieval mechanism shown in FIG. 3A will be provided below with regard to FIG. 3B.

Figure 3B:
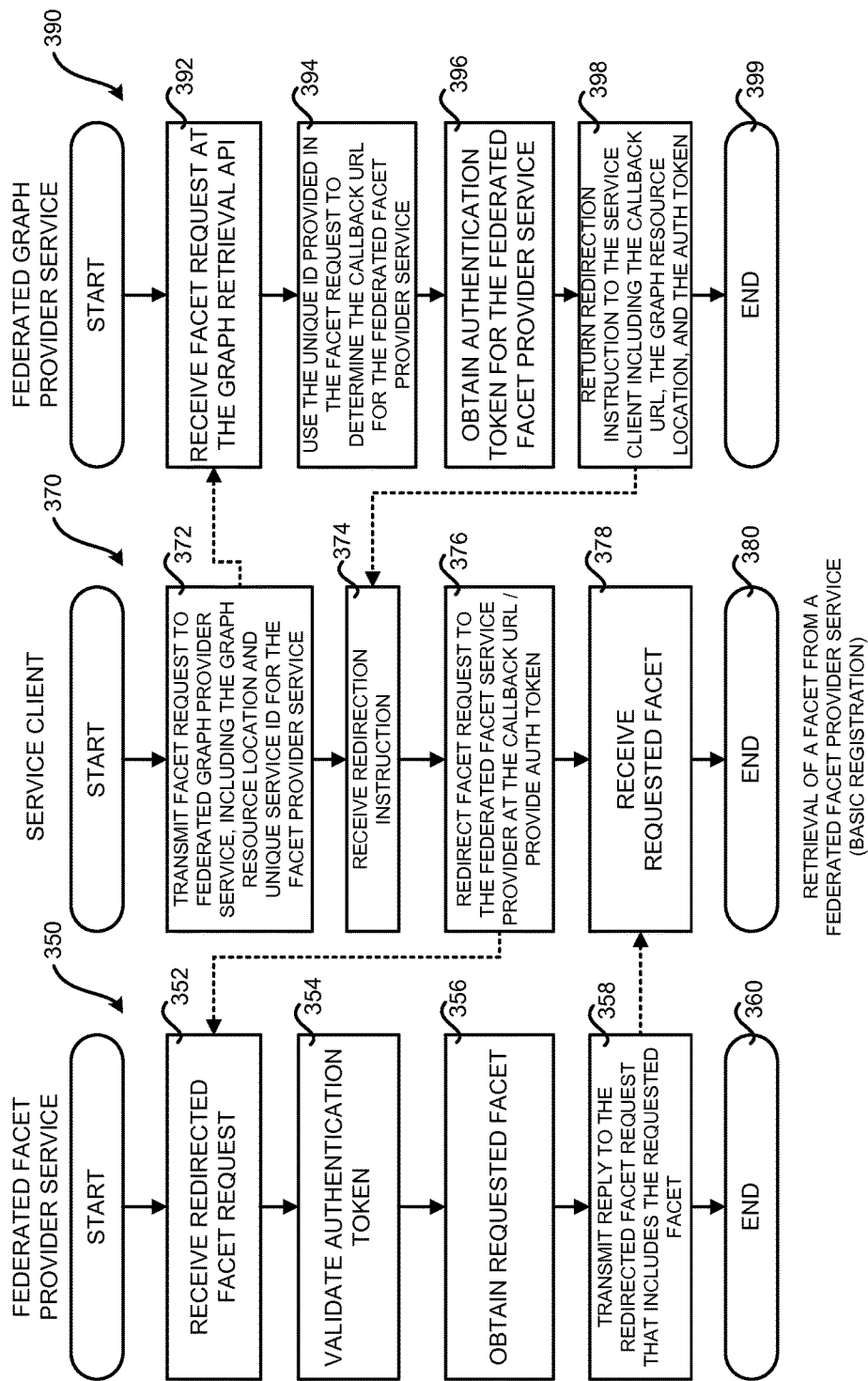
FIG. 3B is a flow diagram showing several routines that together illustrate additional aspects of the mechanism shown in FIG. 3B for retrieval of a facet from a federated facet provider service, according to one configuration disclosed herein.

FIG. 3B is a flow diagram showing several routines 350, 370, and 390, that together illustrate additional aspects of the mechanism shown in FIG. 3B for retrieval of a facet 320 from a federated facet provider service 108 when the basic registration mechanism described above has been utilized. The routine 350 represents operations performed by the federated facet provider service 108, the routine 370 represents operations performed by the service client 306, and the routine 390 represents operations performed by the federated graph provider service 102. These routines will be described together.

The routine 370 begins at operation 372, where the service client 306 transmits a facet request 308 to the federated graph provider service 102. As discussed above, the facet request 308 includes a graph resource location 310 for the graph resource for which a facet is being requested, and a unique service ID 120 for the federated facet provider service 108 that provides the requested facet.

The routine 390 begins at operation 392, where the federated graph provider service 102 receives the facet request 308 at the graph retrieval API 302. In response to receiving the facet request 308, the routine 390 proceeds to operation 394, where the federated graph provider service 102 utilizes the unique service ID 120 provided in the facet request 308 to determine the callback URL 122 for the federated facet provider service 108. The routine 390 then proceeds to operation 396.

At operation 396, the federated graph provider service 102 obtains the authentication token 314 for the federated facet provider service 108. As mentioned above, the federated graph provider service 102 obtains the authentication token 314 from one of the network services 104A-104N in one particular configuration. Once the authentication token 314 has been obtained, the routine 390 proceeds to operation 398, where the redirection instruction 312 is returned to the service client 306. As discussed above, the redirection instruction 312 causes the service client 306 to redirect to the callback URL 122 of the federated facet provider service 108 and to provide the graph resource location 310 as a query parameter in the facet request 316. The service client 306 also includes the authentication token 314 provided by the federated graph provider service 102 in the facet request 316. The routine 390 continues from operation 398 to operation 399, where it ends.

At operation 374 of the routine 370, the service client 306 receives the redirection instruction 312 from the federated graph provider service 102. The routine 370 then proceeds to operation 376, where the service client 306 redirects to the callback URL 122 provided by the federated facet provider service 108. In particular, the service client transmits a facet request 316 to the callback URL 122 that includes the graph resource location 310 from the original facet request 308 and the authentication token 314 provided by the federated graph provider service 102.

The routine 350 begins at operation 352, where the federated facet provider service 108 receives the facet request 316, including the authentication token 314. From operation 352, the routine 350 proceeds to operation 354, where the federated facet provider service 108 validates the authentication token 314. If the authentication token 314 can be validated, the routine 350 proceeds from operation 354 to operation 356, where the federated facet provider service 108 obtains the requested facet 320 from the data store 112. As discussed above, the graph resource location 310 from the original facet request 308 can be utilized to locate the requested facet 320. The routine 350 then proceeds to operation 358, where the federated facet provider service 108 transmits a reply 318 to the service client 306 that includes the requested facet 320. The routine 350 then proceeds from operation 358 to operation 360, where it ends.

The service client 306 receives the requested facet 320 at operation 378 of the routine 370. As discussed above, the service client 306 can perform various types of processing on the facet 320, including combining the facet 320 with facets obtained from other federated facet provider services 108. The routine 370 then proceeds from operation 378 to operation 380, where it ends.

Figure 4A:
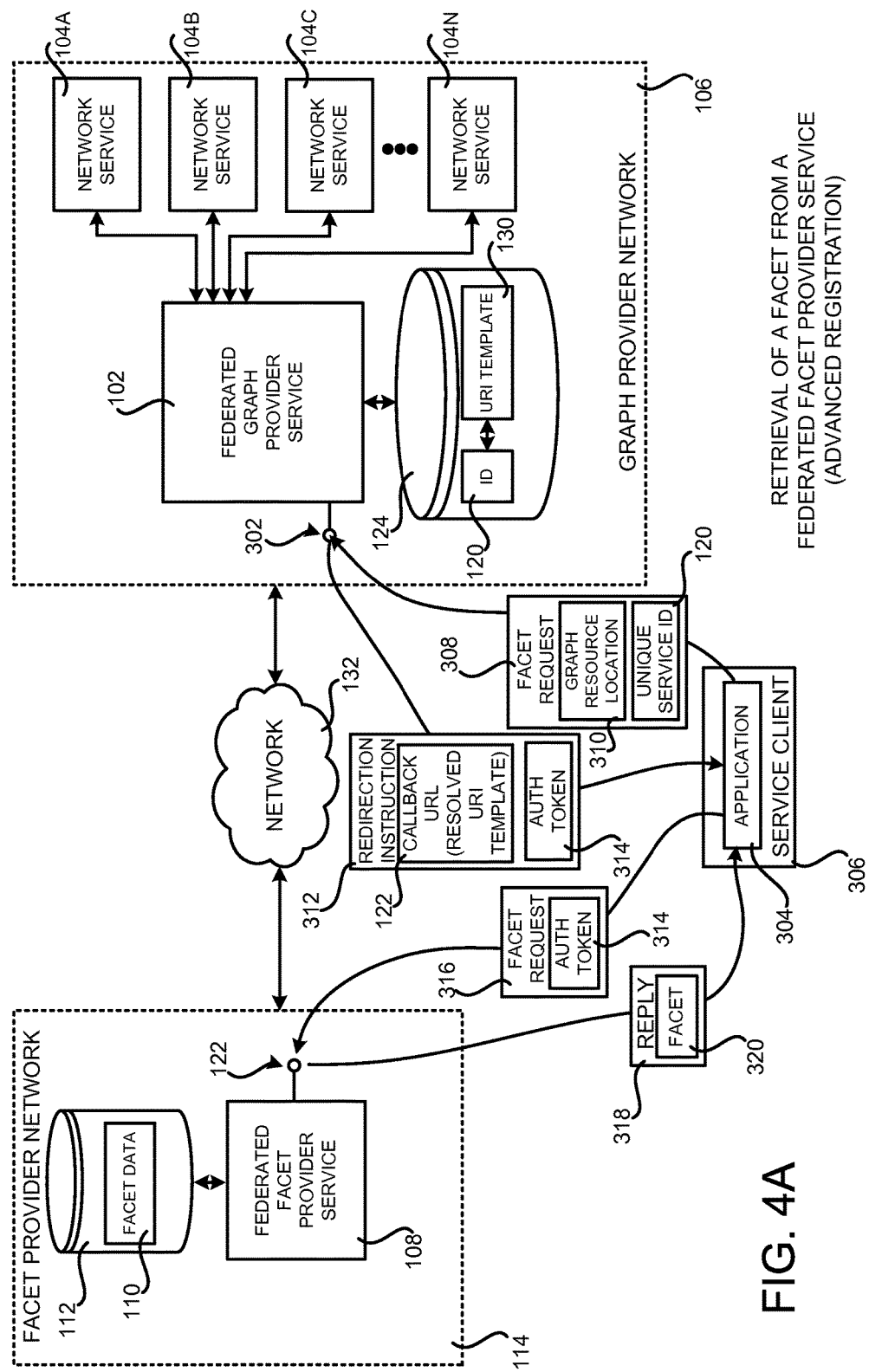
FIG. 4A is a network diagram showing aspects of another mechanism for retrieval of a facet from a federated facet provider service that utilizes a URI template, according to one configuration disclosed herein.

FIG. 4A is a network diagram showing aspects of another mechanism for retrieval of a facet 320 from a federated facet provider service 108 that utilizes a URI template 130, according to one configuration disclosed herein. When the advanced registration mechanism described above has been utilized, the federated graph provider service 102 can utilize the unique ID 120 associated with a federated facet provider service 108 to obtain the URI template 130 for the federated facet provider service 108. The federated graph provider service 102 can then resolve the URI template 130 to generate the network address (e.g. the callback URL 122) of the network service API (e.g. web service API) exposed by the federated facet provider service 108 for obtaining the requested facet. Additional details regarding this mechanism are provided below.

In the example shown in FIG. 4A, the facet request 308 also specifies the graph resource location 310 for the graph resource for which the facet is being requested and the unique service ID 120 for the federated facet provider service 108. In this example, however, instead of directly obtaining the callback URL 122 for the federated facet provider service 108, the federated graph provider service 102 utilizes the unique service 102 provided in the facet request 308 to obtain the URL template 130 associated with the federated facet provider service 108. The federated graph provider service 102 can resolve the URI template 130 to generate the callback URL 122 for the federated facet provider service 108. A redirection instruction 312 can then be provided in response to the facet request 308 that includes the generated callback URL 122 and the authentication token 314, as in the mechanism described above with regard to FIGS. 3A and 3B.

Referring back to the BestBoots example momentarily, the facet request 308 in this example would be in the form of an HTTP GET request to "graph.contoso.com/v1.0/users/ jsmith@contoso.com/?facet=https//bestboots.com/v1/Boot-Preferences-advanced HTTP/1.1 As can be seen, this example HTTP request specifies the graph resource location 310, in this case the identity of the user jsmith@contoso.com, and the unique service ID 120 of the BestBoots federated facet provider service 108, in this case "https//bestboots.com/v1/BootPreferences-advanced."

In this example, the Contoso-operated federated graph provider service 102 would identify the previously-provided URI template 130 associated with the specified unique service ID 120 and resolve the URI template 130 to obtain the callback URL of the BestBoots-operated federated facet provider service 108. In this implementation, the utilization of resolved URI template as the callback URI 122 for a federated facet provider service 108 can provide a simpler URL than in the configuration where the callback URL 122 is expressly defined. For example, using the BestBoots scenario, the federated graph provider service 102 might provide a response (i.e. a redirection instruction 312) in the form of the following:

```
HTTP/1.1 302 Found
Location:                    https://bestboots-preferences-
advanced.apigateway.serviceprovider.com/jsmith@contoso.com
Authorization: Bearer abcdefg
```

In response to receiving the redirection instruction 312, the service client 306 redirects to the specified callback URL 122 with the provided authentication token 314. For instance, in the BestBoots example, the service client 306 generates an HTTP facet request 316 to the callback URL 122 of the federated facet provider service 108, in this example "https://bestboots-preferences-advanced.apigateway.serviceprovider.com/jsmith@contoso.com." The facet request 316 also includes the authentication token 314. In response to receiving the facet request 316, the federated facet provider service 108 validates the authentication token 314 and, if validated, returns a reply 318 to the service client 306 with the requested facet 320. In the BestBoots example, the replay 318 may be formatted as follows:

```
HTTP/1.1 200 OK
Content-Type: application/json
{
"facetId":        "https://bestboots.com/v1/BootPreferences-
advanced",
"value":[{Boot size for user jsmith@contoso.com}]
}
```

Figure 4B:
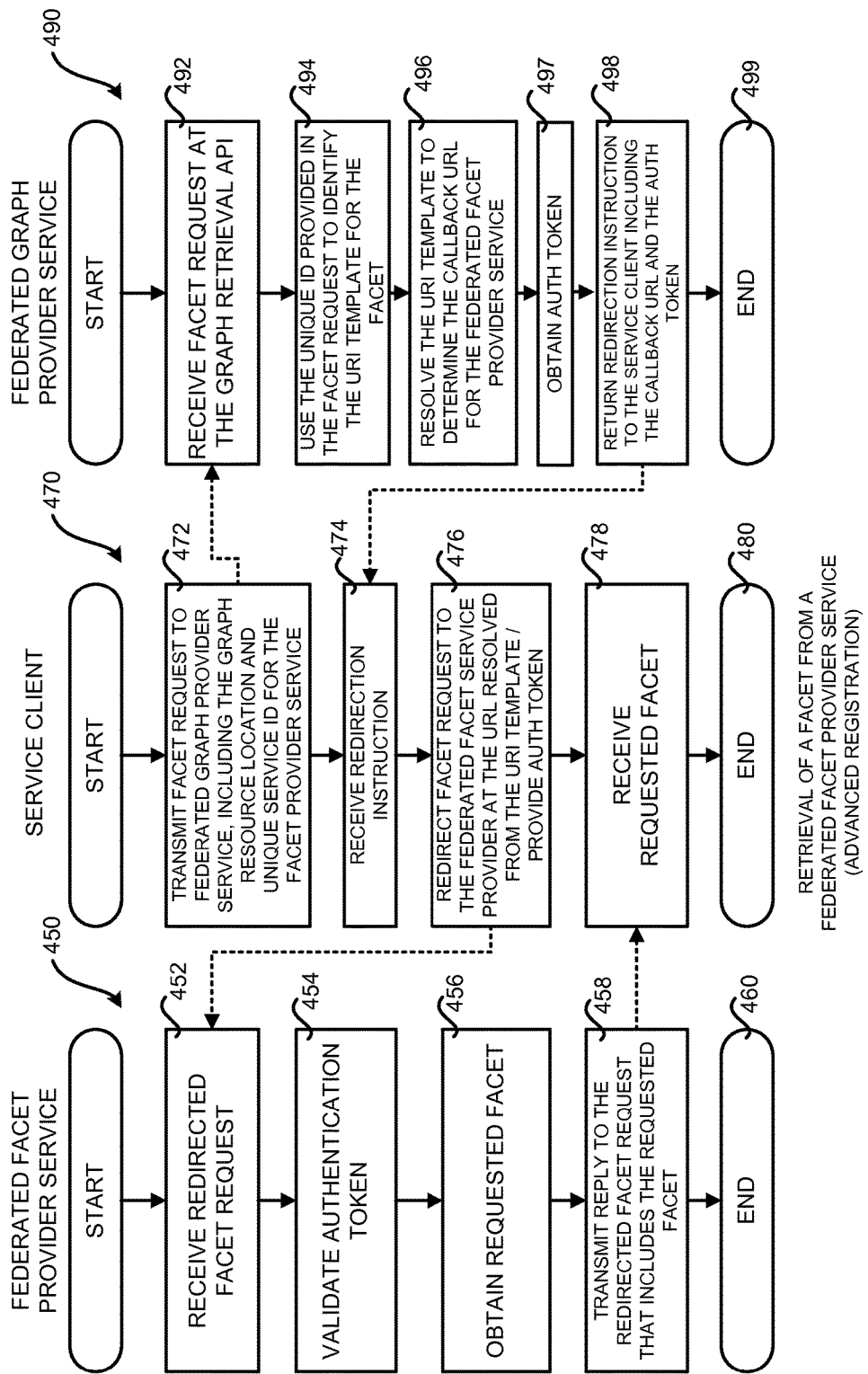
FIG. 4B is a flow diagram showing several routines that together illustrate additional aspects of the mechanism shown in FIG. 4A for retrieval of a facet from a federated facet provider service utilizing a URI template, according to one configuration disclosed herein.

FIG. 4B is a flow diagram showing several routines 450, 470, and 490, that together illustrate additional aspects of the mechanism shown in FIG. 4A for retrieval of a facet 320 from a federated facet provider service 108 utilizing a URI template 130 when the advanced registration mechanism described above has been utilized. The routine 450 represents operations performed by the federated facet provider service 108, the routine 470 represents operations performed by the service client 306, and the routine 490 represents operations performed by the federated graph provider service 102. These routines will be described together.

The routine 470 begins at operation 472, where the service client 306 transmits a facet request 308 to the federated graph provider service 102. As discussed above, the facet request 308 includes a graph resource location 310 for the graph resource for which a facet is being requested, and a unique service ID 120 for the federated facet provider service 108 that provides the requested facet.

The routine 490 begins at operation 492, where the federated graph provider service 102 receives the facet request 308 at the graph retrieval API 302. In response to receiving the facet request 308, the routine 490 proceeds to operation 494, where the federated graph provider service 102 utilizes the unique service ID 120 provided in the facet request 308 to determine the previously-provided URI template 130 for the federated facet provider service 108. The routine 490 then proceeds to operation 496.

At operation 496, the federated graph provider service 102 resolves the URI template 130 to obtain the callback URL 122 for the federated facet provider service 108. The routine 490 then proceeds to operation 497, where the federated graph provider service 102 obtains the authentication token 314 for the federated facet provider service 108. As mentioned above, the federated graph provider service 102 obtains the authentication token 314 from one of the network services 104A-104N in one particular configuration.

Once the authentication token 314 has been obtained, the routine 490 proceeds to operation 498, where the redirection instruction 312 is returned to the service client 306. As discussed above, the redirection instruction 312 causes the service client 306 to redirect to the callback URL 122 of the federated facet provider service 108, in this case the resolved URI template 130. The routine 490 continues from operation 498 to operation 499, where it ends.

At operation 474 of the routine 470, the service client 306 receives the redirection instruction 312 from the federated graph provider service 102. The routine 470 then proceeds to operation 476, where the service client 306 redirects to the callback URL 122 provided by the federated facet provider service 108. In particular, the service client transmits a facet request 316 to the callback URL 122 (i.e. the resolved URI template 130) that includes the authentication token 314 provided by the federated graph provider service 102.

The routine 450 begins at operation 452, where the federated facet provider service 108 receives the facet request 316, including the authentication token 314. From operation 452, the routine 450 proceeds to operation 454, where the federated facet provider service 108 validates the authentication token 314. If the authentication token 314 can be validated, the routine 450 proceeds from operation 454 to operation 456, where the federated facet provider service 108 obtains the requested facet 320 from the data store 112. The routine 450 then proceeds to operation 458, where the federated facet provider service 108 transmits a reply 318 to the service client 306 that includes the requested facet 320. The routine 450 then proceeds from operation 458 to operation 460, where it ends.

The service client 306 receives the requested facet 320 at operation 478 of the routine 470. As discussed above, the service client 306 can perform various types of processing on the facet 320, including combining the facet 320 with facets obtained from other federated facet provider services 108. The routine 470 then proceeds from operation 478 to operation 480, where it ends.

As mentioned briefly above, the federated graph provider service 102, the federated facet provider service 108, and the service client 306 can be located in different geographic locations in specific implementations of the technologies disclosed herein. In one specific example, for instance, the federated graph provider service 102 is located in the United States, the federated facet provider service 108 is located in Germany, and the service client 306 is located in France.

In this example implementation, the service client 306 can utilize the mechanism described above to make a request 308 for sensitive data that is not permitted to leave the borders of the European Union ("EU"). The request 308 would be made to the federated graph provider service 102 located in the United States, but would be redirected to the federated facet provider service 108 located in Germany. The service client 306 located in France in this example implementation can, therefore, retrieve the data from the federated facet provider service 108 located in Germany without the data leaving the borders of the EU. As mentioned above, other technical benefits can be realized from an implementation of the technologies disclosed herein.

Figure 5:
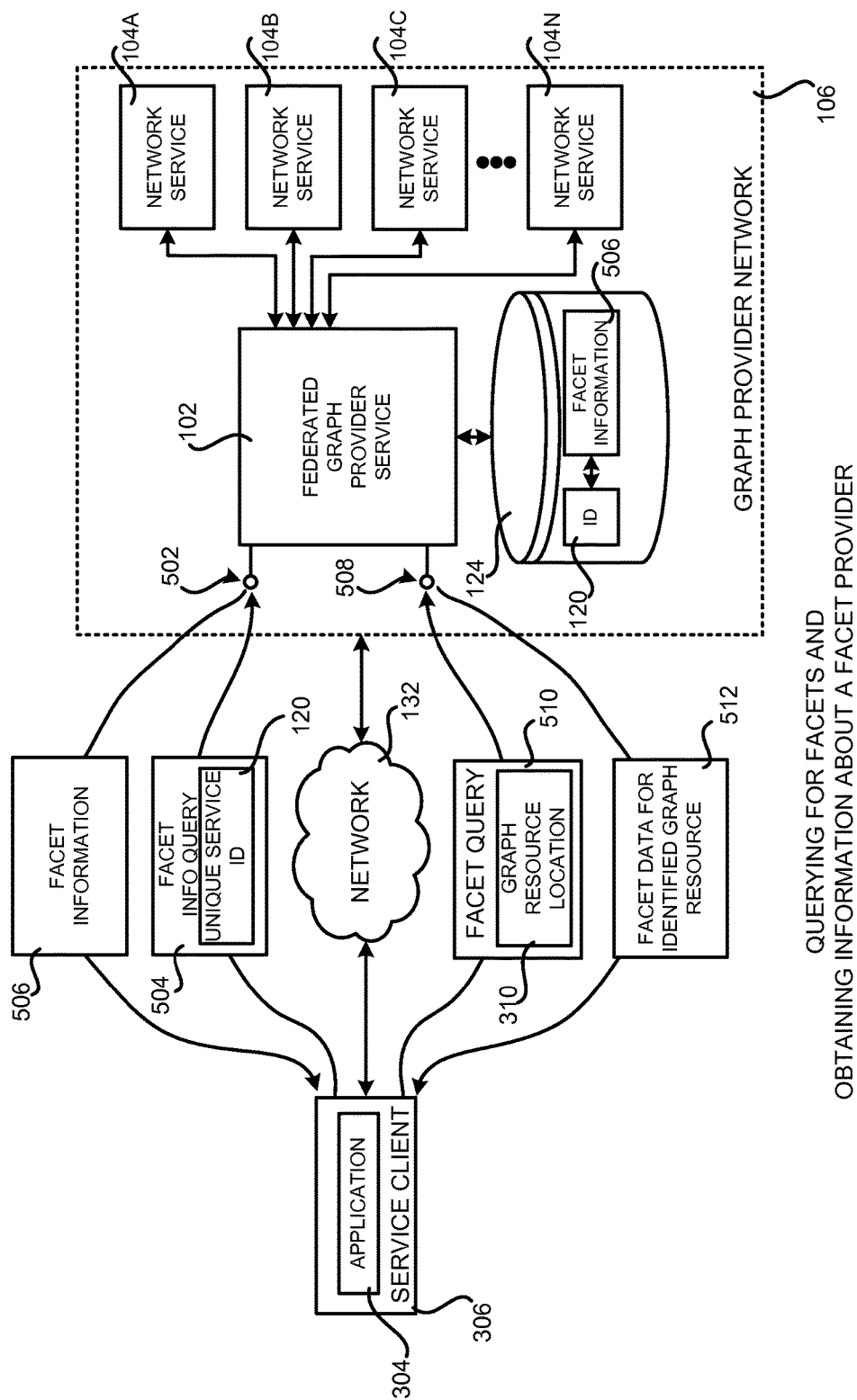
FIG. 5 is a network diagram showing aspects of a mechanism for querying for facets and for obtaining information about a facet provider, according to several configurations disclosed herein.

FIG. 5 is a network diagram showing aspects of a mechanism for querying for facets and for obtaining information about a facet provider, according to several configurations disclosed herein. In particular, in some configurations, the federated graph provider service 102 exposes a network service API 502 (e.g. a web service API) through which callers can obtain information about a particular facet. For example, the federated graph provider service 102 can receive a request (illustrated in FIG. 5 as the facet information query 504) for information about a facet that includes the unique service ID 120 of a registered federated facet provider service 108.

The federated graph provider service 102 can utilize the unique ID 120 associated with the federated facet provider service 108 to obtain the requested information 506 about the facet 320 from the data store 124. The requested information 506 about the facet can then be returned in response to the query 504 for information. The information 506 about the facet can include, but is not limited to, the unique service ID 120 associated with the federated facet provider service 108, the name of the entity operating the federated facet provider service 108, a text description of the facet, and/or details regarding the authentication token 314 used to authenticate with the federated facet provider service 108. In the BestBoots example provided above, an HTTP request to perform a facet information query 504 can be formatted as follows:

```
GET
/contoso.com/v1.0/?$facet=https://bestboots.com/v1/BootPreferences
Accept: application/json
```

The facet information 506 provided in response to such a query 504 can be formatted as follows:

```
HTTP/1.1 200 OK
Content-Type: application/json
{
    "value":
    {
    "facetIdentifier":
"https://bestboots.com/v1/BootPreferences",
        "facetProvider": "bestboots.com",
        "facetDescription":"Information about boots",
        "authTokenProvided":"True"
    }
{
```

In some configurations, the federated graph provider service 102 exposes a network service API (e.g. a web service API) through which callers can obtain data identifying the particular facets associated with a resource in the graph. For example, and without limitation, a request to such an API (shown as the facet query API 508 in FIG. 5) can provide the graph resource location 310 for a resource in the graph. In response to such a request, the federated graph provider service 102 can identify the facets 320 associated with the identified resource and provide information 512 regarding the facets in a reply to the query 510.

The facet information 512 might include, for example, the unique service ID 120 associated with each facet, data identifying the entity that operates the associated federated facet provider service 108, a text description of the facet, the callback URL 122 for the associated federated facet provider service 108, and/or details regarding the authentication token used to authenticate with the federated facet provider service 108. In the BestBoots example provided above, an HTTP request for facet information 512 for a user (i.e. jsmith@contoso.com) can be formatted as follows:

GET/contoso.com/v1.0/users/jsmith@contoso.com/$facets
HTTP/1.1
Accept: application/json The facet information 512 provided in response to such a query 510 can be formatted as follows:

```
HTTP/1.1 200 OK
Content-Type: application/json
{
    "value": [
    {
    "facetID":" https://bestboots.com/V1/BootPreferences",
    "facetProvider":"bestboots.com",
    "facetDescription":"Boot size for this user",
    "facetURL":"                             https://bestboots-
preferences.apigateway.serviceprovider.com"
    }]
}
```

It should be appreciated that the facet information 512 can be filtered through an appropriately formatted HTTP GET request in one particular configuration. For instance, in the BestBoots example, the HTTP GET can be formatted in order to limit the facet information 512 to facets provided by BestBoots as "GET https://graph.contoso.com/v1.0/users/jsmith@contoso.com/$facets?$filter=facetProvi der eq boots.com." Other types of filtering and sorting can also be applied to the facet information 512 returned by a call to the facet query API 508.

FIG. 6 is a flow diagram showing a routine 600 that illustrates additional aspects of the mechanism shown in FIG. 5 for obtaining information about a facet provider, according to one configuration disclosed herein. The routine 600 begins at operation 602, where the federated graph provider service 102 receives a facet information query 504 that includes a unique service ID 122 for a federated facet provider service 108. In response to receiving such a request, the routine 600 proceeds from operation 602 to operation 604.

At operation 604, the federated graph provider service 102 retrieves the facet information 506 for the facet provider associated with the provided unique service ID 120. The routine 600 then proceeds from operation 604 to operation 606, where the federated graph provider service 102 returns the facet information 506 in reply to the facet information query 504. As discussed above, the facet information 506 can include, but is not limited to, the unique service ID 120 associated with the federated facet provider service 108, the name of the entity operating the federated facet provider service 108, a text description of the facet, and/or details regarding the authentication token 314 used to authenticate with the federated facet provider service. The routine 600 then proceeds from operation 606 to operation 608, where it ends.

FIG. 7 is a flow diagram showing a routine 700 that illustrates additional aspects of the mechanism shown in FIG. 5 for querying for facets, according to one configuration disclosed herein. The routine 700 begins at operation 702, where the federated graph provider service 102 receives a facet query 510 that specifies a graph resource location 310 for a resource in the graph. The routine 700 then proceeds from operation 702 to operation 704, where the federated graph provider service 102 determines the facets and/or facet providers that apply to the specified resource. The routine 700 then proceeds from operation 704 to operation 706.

At operation 706, the federated graph provider service 102 filters, sorts, or applies other requested operations to the facet information 506 for the identified resource in the graph. The routine 700 then proceeds from operation 706 to operation 708, where the federated graph provider service 102 returns the facet information 512 for the identified graph resource in reply to the facet query 310. As discussed above, the facet information 512 might include, but is not limited to, the unique service ID 120 associated with each facet 320, data identifying the entity that operates the associated federated facet provider service 108, a text description of the facet, the callback URL 122 for the associated federated facet provider service 108, and/or details regarding the authentication token used to authenticate with the federated facet provider service 102. The routine 700 then proceeds from operation 708 to operation 710, where it ends.

Figure 8:
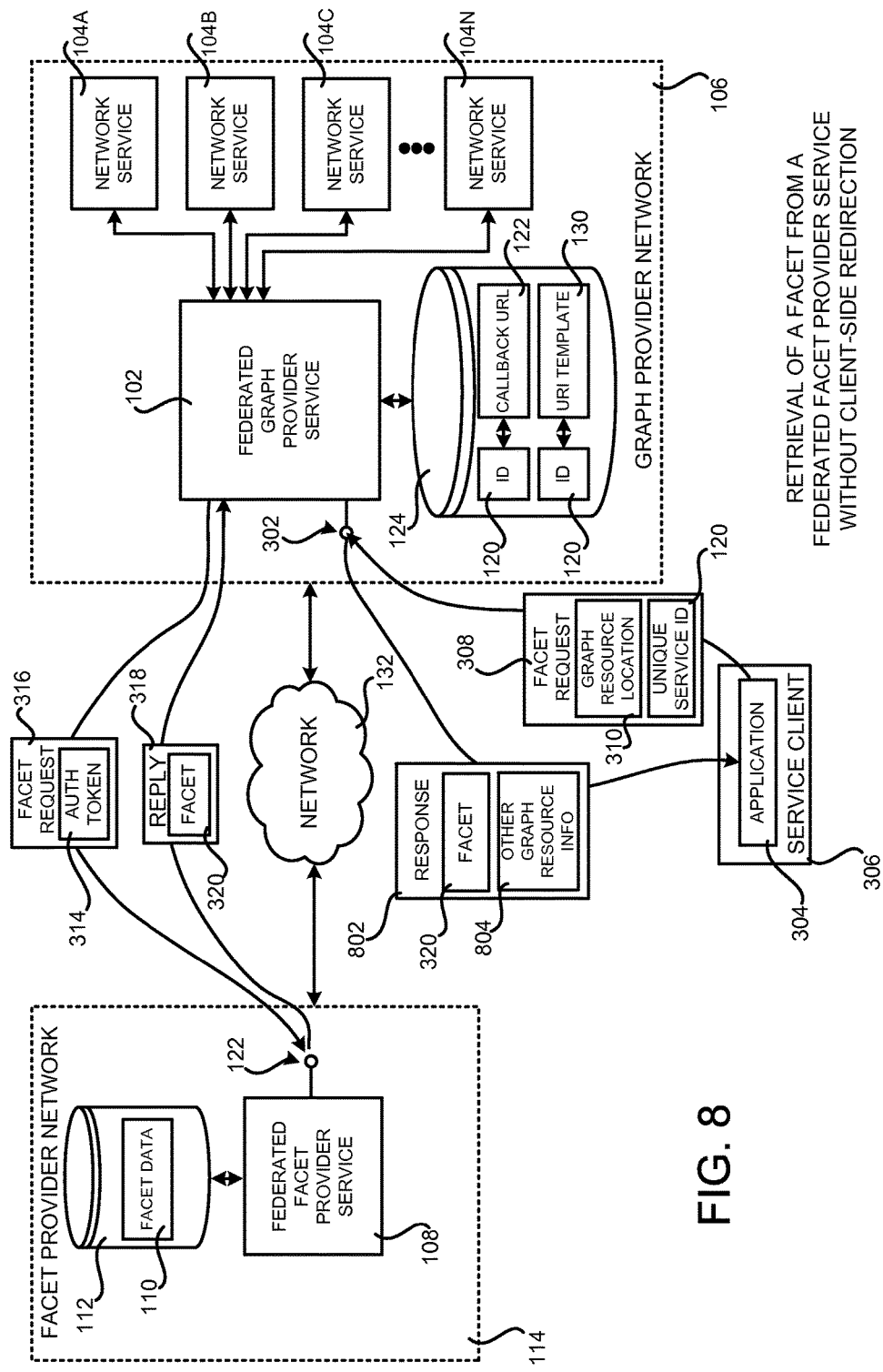
FIG. 8 is a network diagram showing aspects of a mechanism for retrieval of a facet from a federated facet provider service that does not utilize client-side redirection, according to one configuration disclosed herein.

FIG. 8 is a network diagram showing aspects of a mechanism for retrieval of a facet 320 from a federated facet provider service 108 that does not utilize client-side redirection, according to one configuration disclosed herein. As shown in FIG. 8, the federated graph provider service 102 can receive a facet request 308 that specifies a graph resource location 310 for a resource in the graph and a unique service ID 120 for a federated facet provider service 108. The federated graph provider service 102 then obtains the callback URL 122 directly or using a URI template 130 in the manner described above.

In this configuration, however, the federated graph provider service 102 utilizes the callback URL 122 of the federated facet provider service 108 and the authentication token 314 to directly obtain the requested facet 320 from the federated facet provider service 108 itself. For example, and as shown in FIG. 8, the federated graph provider service 102 can transmit a facet request 316 to the callback URL 122 that includes the authentication token 314.

In response to receiving the facet request 316, the federated facet provider service 108 validates the authentication token 314 and, if validated, retrieves the requested facet 320 from the data store 112 and returns a reply 318 to the federated graph provider service 102 that includes the facet 320. The federated graph provider service 102 then returns a response 802 to the service client that includes the facet 320. In this configuration, no redirection of the service client 306 to the federated facet provider service 108 is required, thereby enabling the retrieval of the requested facet 320 to be performed more quickly. Additionally, in this configuration the federated graph provider service 102 can also provide other information 804 associated with the graph resource that is obtained from the federated network services 104A-104N within the graph provider network 106 in response to such a request 308. Additional details regarding this mechanism will be provided below with regard to FIG. 9.

Figure 9:
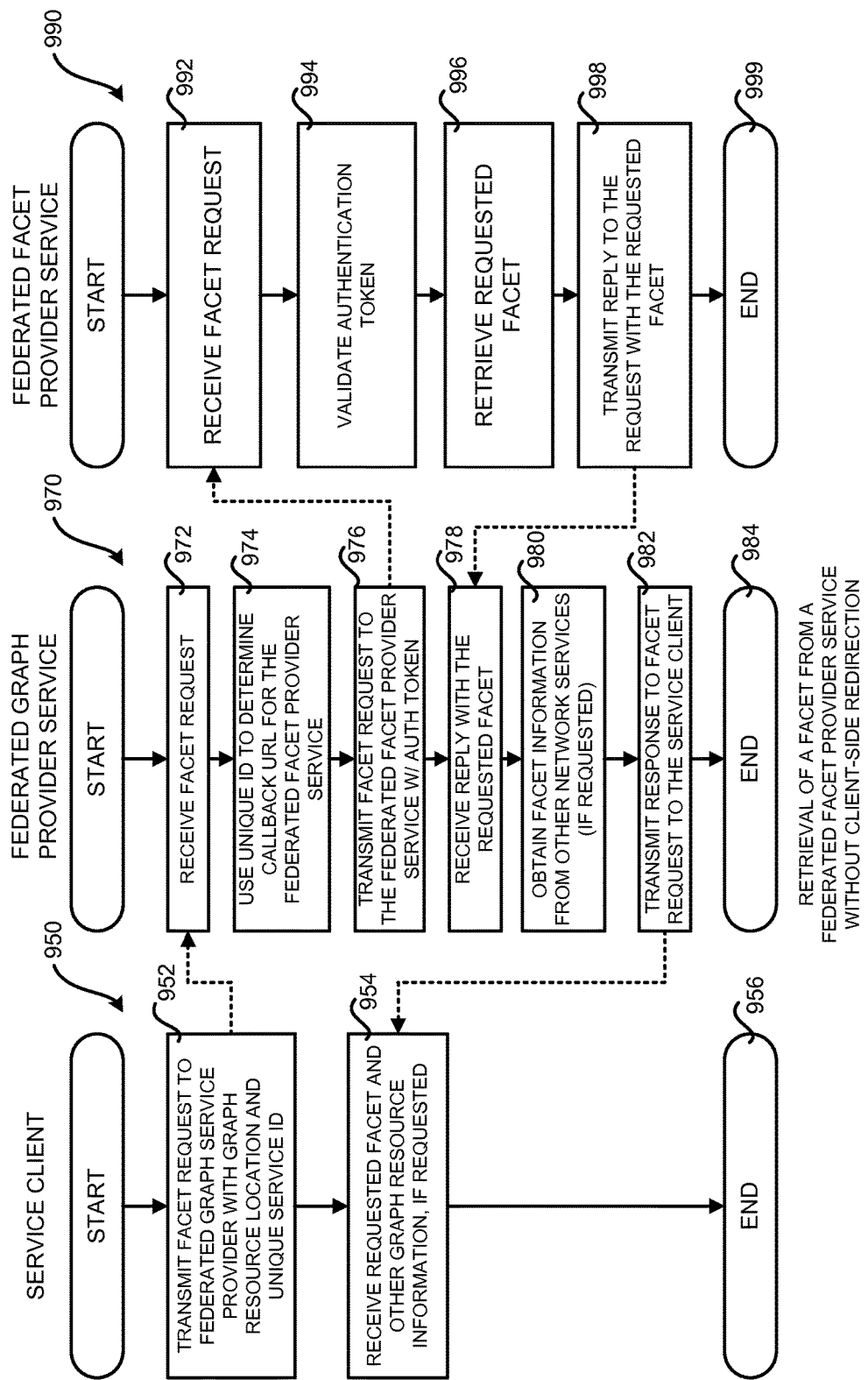
FIG. 9 is a flow diagram showing several routines that together illustrate additional aspects of the mechanism shown in FIG. 8 for retrieval of a facet from a federated facet provider service without client-side redirection, according to one configuration disclosed herein.

FIG. 9 is a flow diagram showing several routines 950, 970, and 990 that together illustrate additional aspects of the mechanism shown in FIG. 8 for retrieval of a facet 320 from a federated facet provider service 108 without redirecting a service client 306, according to one configuration disclosed herein. The routine 950 represents operations performed by the service client 306, the routine 970 represents operations performed by the federated graph provider service 102, and the routine 990 represents operations performed by the federated facet provider service 108. These routines will be described together.

The routine 950 begins at operation 952, where the service client 306 transmits a facet request 308 to the federated graph provider service 102. The routine 970 begins at operation 972, where the federated graph provider service 102 receives the facet request 308. The routine 970 then proceeds to operation 974, where the federated graph provider service 102 determines the callback URL 122 for the federated facet provider service 108. As discussed above, the callback URL 122 can be explicitly provided or determined utilizing a URI template 130 associated with the federated facet provider service 108.

From operation 974, the routine 970 proceeds to operation 976, where the federated graph provider service 102 transmits a facet request 316 to the callback URL 122 of the federated facet provider service 108 that includes the authentication token 314. The routine 990 begins at operation 992, where the federated facet provider service 108 receives the facet request 316, including the authentication token 314. The routine 990 then proceeds from operation 992 to operation 994.

At operation 994, the federated facet provider service 108 validates the authentication token 314. If the authentication token 314 can be validated, the routine 990 proceeds from operation 994 to operation 996, where the federated facet provider service 108 obtains the requested facet 320 from the data store 112. The routine 990 then proceeds to operation 998, where the federated facet provider service 108 transmits a reply 318 to the federated graph provider service 102 that includes the requested facet 320. The routine 990 then proceeds from operation 998 to operation 999, where it ends.

The federated graph provider service 102 receives the reply 318 with the requested facet 320 at operation 978 of the routine 970. The routine 970 then proceeds from operation 978 to operation 980, where the federated graph provider service 102 retrieves other graph resource information 804 from the other network services 104A-104N, if requested. The routine 970 then proceeds to operation 982, where the federated graph provider service 102 transmits the response 802 to the service client 306, including the facet 304 and the other graph resource information 804, if requested. The routine 970 then proceeds from operation 982 to operation 984, where it ends.

The service client 306 receives the response 802, including the facet 320 and any other graph resource information 804, at operation 954 of the routine 950. The routine 950 then proceeds from operation 954 to operation 956, where it ends.

It should be appreciated that the application 304 executing on the service client 306, the federated graph provider service 102, the federated facet provider service 108, and the other software components descried above can be implemented using or in conjunction with binary executable files, dynamically linked libraries ("DLLs"), APIs, network services, script files, interpreted program code, software containers, object files, bytecode suitable for just-in-time compilation, and/or other types of program code that can be executed by a processor to perform the operations described herein with regard to FIGS. 1-9. Other types of software components not specifically mentioned herein can also be utilized.

Figure 10:
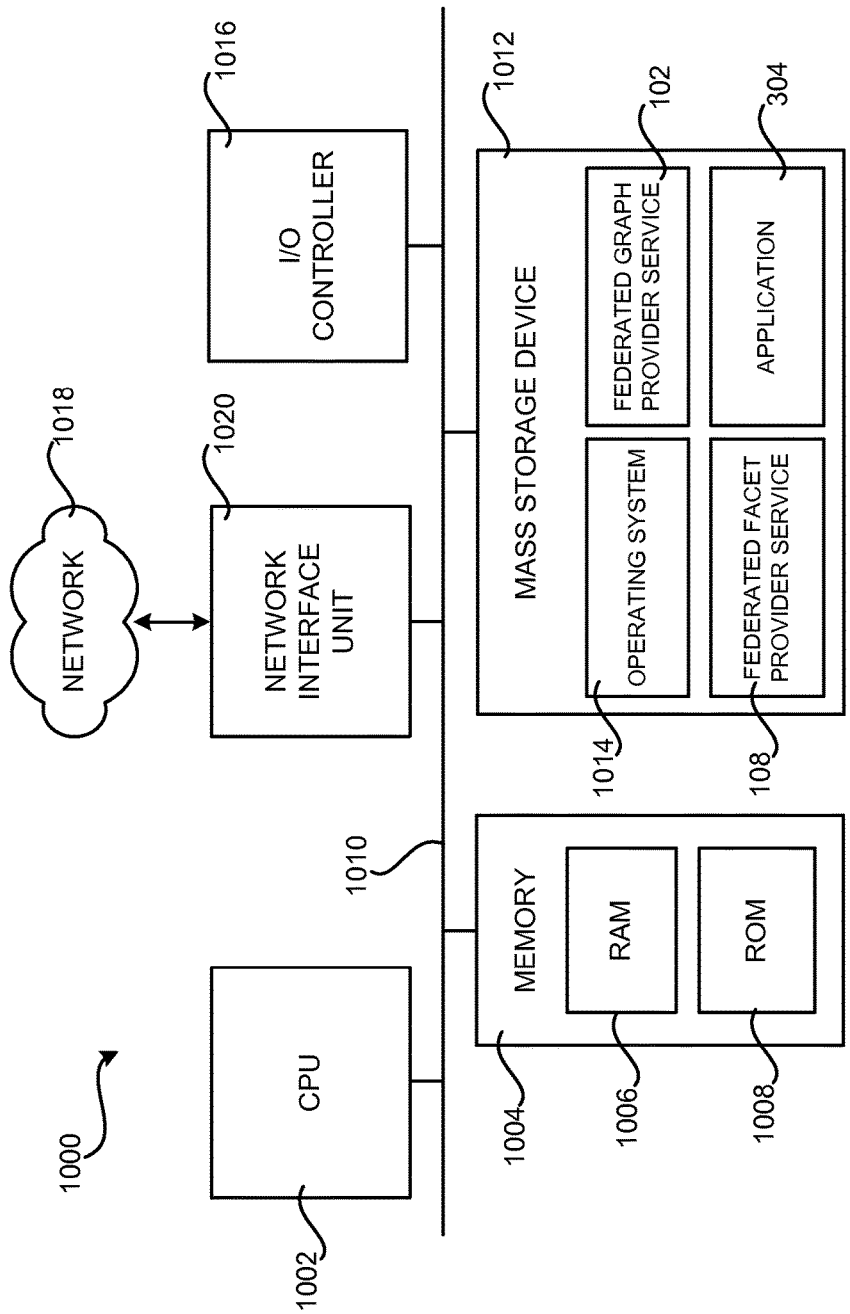
FIG. 10 is a computer architecture diagram showing an illustrative computer hardware and software architecture for a computing system that is capable of implementing aspects of the technologies presented herein.

FIG. 10 is a computer architecture diagram that shows an architecture for a computer 1000 capable of executing the software components described herein. The architecture illustrated in FIG. 10 is an architecture for a server computer, mobile phone, e-reader, smart phone, desktop computer, netbook computer, tablet computer, laptop computer, or another type of computing device suitable for executing the software components presented herein.

In this regard, it should be appreciated that the computer 1000 shown in FIG. 10 can be utilized to implement a computing device capable of executing any of the software components presented herein. For example, and without limitation, the computing architecture described with reference to the computer 1000 can be utilized to implement a server computer in the graph provider network 106 for executing the federated graph provider service 102, to implement a server computer in the facet provider network 114 for executing the federated facet provider service 108, to implement a service client 306 for executing the application 304, and/or to implement other types of computing systems for executing any of the other software components described above.

The computer 1000 illustrated in FIG. 10 includes a central processing unit 1002 ("CPU"), a system memory 1004, including a random access memory 1006 ("RAM") and a read-only memory ("ROM") 1008, and a system bus 1010 that couples the memory 1004 to the CPU 1002. A basic input/output system containing the basic routines that help to transfer information between elements within the computer 1000, such as during startup, is stored in the ROM 1008. The computer 1000 further includes a mass storage device 1012 for storing an operating system 1014 and one or more programs including, but not limited to the federated graph provider service 102, the federated facet provider service 108, or the application 304, depending upon the use of the computer 1000. The mass storage device 1012 can also be configured to store other types of programs and data not specifically shown in FIG. 10.

The mass storage device 1012 is connected to the CPU 1002 through a mass storage controller (not shown) connected to the bus 1010. The mass storage device 1012 and its associated computer readable media provide non-volatile storage for the computer 1000. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data.

For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1000. For purposes of the claims, the phrase "computer storage medium," and variations thereof, does not include waves or signals per se or communication media.

According to various configurations, the computer 1000 can operate in a networked environment using logical connections to remote computers through a network such as the network 1018. The computer 1000 can connect to the network 1018 through a network interface unit 1020 connected to the bus 1010. It should be appreciated that the network interface unit 1020 can also be utilized to connect to other types of networks and remote computer systems. The computer 1000 can also include an input/output controller 1016 for receiving and processing input from a number of other devices, including a keyboard, mouse, touch input, or electronic stylus (not shown in FIG. 10). Similarly, the input/output controller 1016 can provide output to a display screen, a printer, or other type of output device (also not shown in FIG. 10).

It should be appreciated that the software components described herein, such as the federated graph provider service 102, the federated facet provider service 108, and the application 304, can, when loaded into the CPU 1002 and executed, transform the CPU 1002 and the overall computer 1000 from a general-purpose computing system into a special-purpose computing system customized to facilitate the functionality presented herein. The CPU 1002 can be constructed from any number of transistors or other discrete circuit elements, which can individually or collectively assume any number of states. More specifically, the CPU 1002 can operate as a finite-state machine, in response to executable instructions contained within the software modules disclosed herein, such as the application 304. These computer-executable instructions can transform the CPU 1002 by specifying how the CPU 1002 transitions between states, thereby transforming the transistors or other discrete hardware elements constituting the CPU 1002.

Encoding the software modules presented herein, such as the application 304, can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software components presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It should also be appreciated that the architecture shown in FIG. 10 for the computer 1000, or a similar architecture, can be utilized to implement other types of computing devices, including hand-held computers, embedded computer systems, mobile devices such as smartphones and tablets, and other types of computing devices known to those skilled in the art. It is also contemplated that the computer 1000 might not include all of the components shown in FIG. 10, can include other components that are not explicitly shown in FIG. 10, or can utilize an architecture completely different than that shown in FIG. 10.

Figure 11:
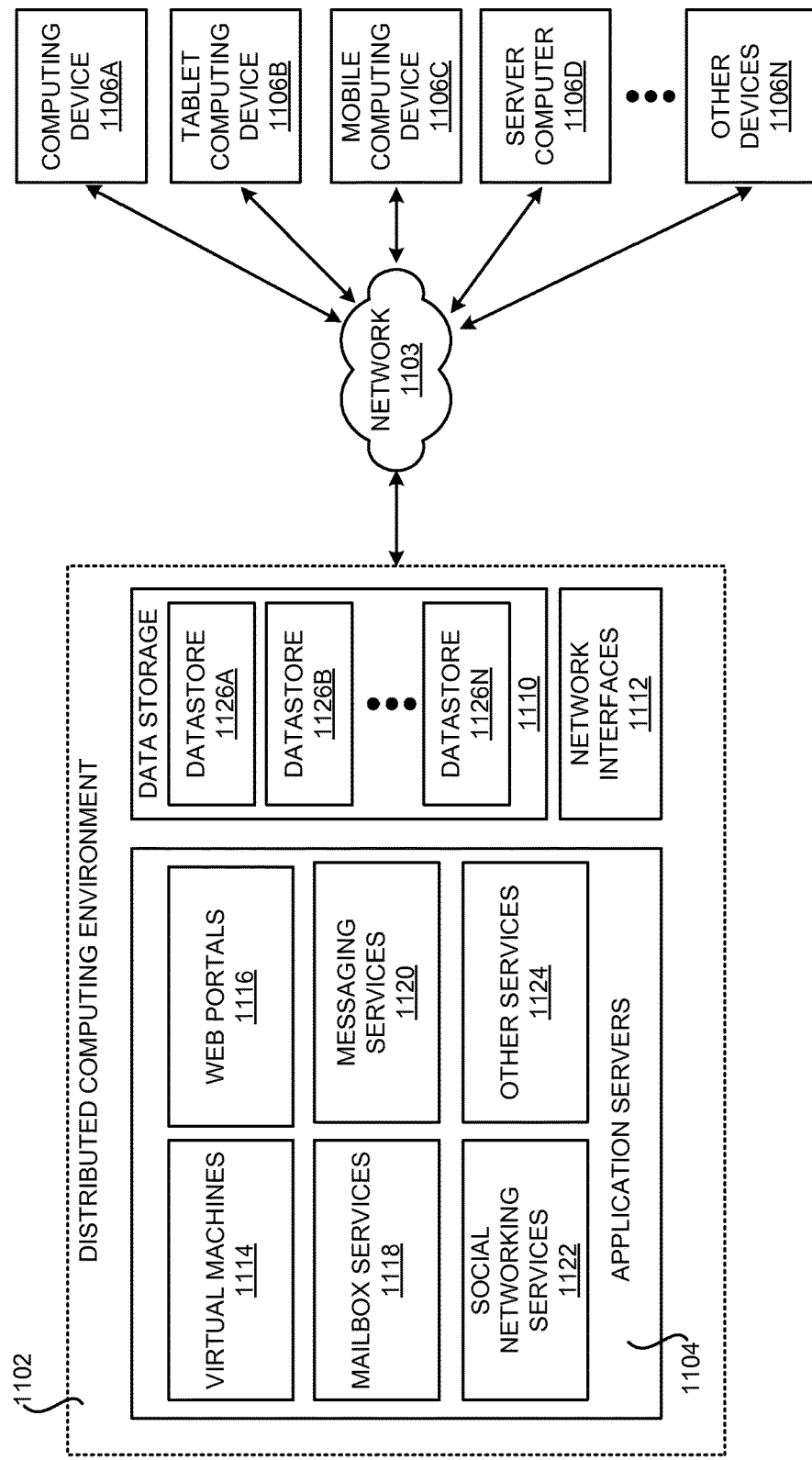
FIG. 11 is a computer system architecture and network diagram illustrating a distributed computing environment capable of implementing aspects of the technologies presented herein.

FIG. 11 shows aspects of an illustrative distributed computing environment 1102 in which the software components described herein can be executed. Thus, the distributed computing environment 1102 illustrated in FIG. 11 can be used to execute program code, such as the federated graph provider service 102, the federated facet provider service 108, and the application 304, capable of providing the functionality described herein with respect to FIGS. 1-9, and/or any of the other software components described herein. For example, and without limitation, the distributed computing environment 1102 can be utilized to implement the graph provider network 106 and/or the facet provider network 114.

According to various implementations, the distributed computing environment 1102 operates on, in communication with, or as part of a network 1103. One or more client devices 1106A-1106N (hereinafter referred to collectively and/or generically as "clients 1106") can communicate with the distributed computing environment 1102 via the network 1103 and/or other connections (not illustrated in FIG. 11).

In the illustrated configuration, the clients 1106 include: a computing device 1106A such as a laptop computer, a desktop computer, or other computing device; a "slate" or tablet computing device ("tablet computing device") 1106B; a mobile computing device 1106C such as a mobile telephone, a smart phone, or other mobile computing device; a server computer 1106D; and/or other devices 1106N. It should be understood that any number of clients 1106 can communicate with the distributed computing environment 1102. Two example computing architectures for the clients 1106 are illustrated and described herein with reference to FIGS. 10 and 11. It should be understood that the illustrated clients 1106 and computing architectures illustrated and described herein are illustrative, and should not be construed as being limited in any way.

In the illustrated configuration, the distributed computing environment 1102 includes application servers 1104, data storage 1110, and one or more network interfaces 1112. According to various implementations, the functionality of the application servers 1104 can be provided by one or more server computers that are executing as part of, or in communication with, the network 1103. The application servers 1104 can host various services such as the federated graph provider service 102 and the federated facet provider service 108 described above, virtual machines, portals, and/or other resources. In the illustrated configuration, the application servers 1104 host one or more virtual machines 1114 for hosting applications or network services, such as the federated graph provider service 102, the federated facet provider service 108, or other types of applications and/or services. According to various implementations, the virtual machines 1114 host one or more applications and/or software modules, such as the application 304. It should be understood that this configuration is illustrative, and should not be construed as being limiting in any way. The application servers 1104 might also host or provide access to one or more web portals, link pages, web sites, and/or other information ("web portals") 1116.

According to various implementations, the application servers 1104 also include one or more mailbox services 1118 and one or more messaging services 1120. The mailbox services 1118 can include electronic mail ("email") services. The mailbox services 1118 can also include various personal information management ("PIM") services including, but not limited to, calendar services, contact management services, collaboration services, and/or other services. The messaging services 1120 can include, but are not limited to, instant messaging ("IM") services, chat services, forum services, and/or other communication services.

The application servers 1104 can also include one or more social networking services 1122. The social networking services 1122 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 1122 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1122 are provided by other services, sites, and/or providers that might be referred to as "social networking providers." For example, some web sites allow users to interact with one another via email, chat services, and/or other means during various activities and/or contexts such as reading published articles, commenting on goods or services, publishing, collaboration, gaming, and the like. Other services are possible and are contemplated.

The social networking services 1122 can also include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 1122 are not mentioned herein for the sake of brevity. As such, the configurations described above are illustrative, and should not be construed as being limited in any way.

As also shown in FIG. 11, the application servers 1104 can also host other services, applications, portals, and/or other resources ("other services") 1124. The other services 1124 can include, but are not limited to, the network services 104A-104N, and/or any of the other software components described herein. It thus can be appreciated that the distributed computing environment 1102 can provide integration of the technologies disclosed herein with various mailbox, messaging, social networking, productivity, conversion, and/or other types of services or resources.

As mentioned above, the distributed computing environment 1102 can include data storage 1110. According to various implementations, the functionality of the data storage 1110 is provided by one or more databases operating on, or in communication with, the network 1103. The functionality of the data storage 1110 can also be provided by one or more server computers configured to host data for the distributed computing environment 1102. The data storage 1110 can include, host, or provide one or more real or virtual datastores 1126A-1126N (hereinafter referred to collectively and/or generically as "datastores 1126"). The datastores 1126 are configured to host data used or created by the application servers 1104 and/or other data.

The distributed computing environment 1102 can communicate with, or be accessed by, the network interfaces 1112. The network interfaces 1112 can include various types of network hardware and software for supporting communications between two or more computing devices including, but not limited to, the clients 1106 and the application servers 1104. It should be appreciated that the network interfaces 1112 can also be utilized to connect to other types of networks and/or computer systems.

It should be understood that the distributed computing environment 1102 described herein can implement any aspects of the software elements described herein with any number of virtual computing resources and/or other distributed computing functionality that can be configured to execute any aspects of the software components disclosed herein. According to various implementations of the technologies disclosed herein, the distributed computing environment 1102 provides some or all of the software functionality described herein as a service to the clients 1106. It should be understood that the clients 1106 can also include real or virtual machines including, but not limited to, server computers, web servers, personal computers, mobile computing devices, smart phones, and/or other devices. As such, various implementations of the technologies disclosed herein enable any device configured to access the distributed computing environment 1102 to utilize the functionality described herein.

Figure 12:
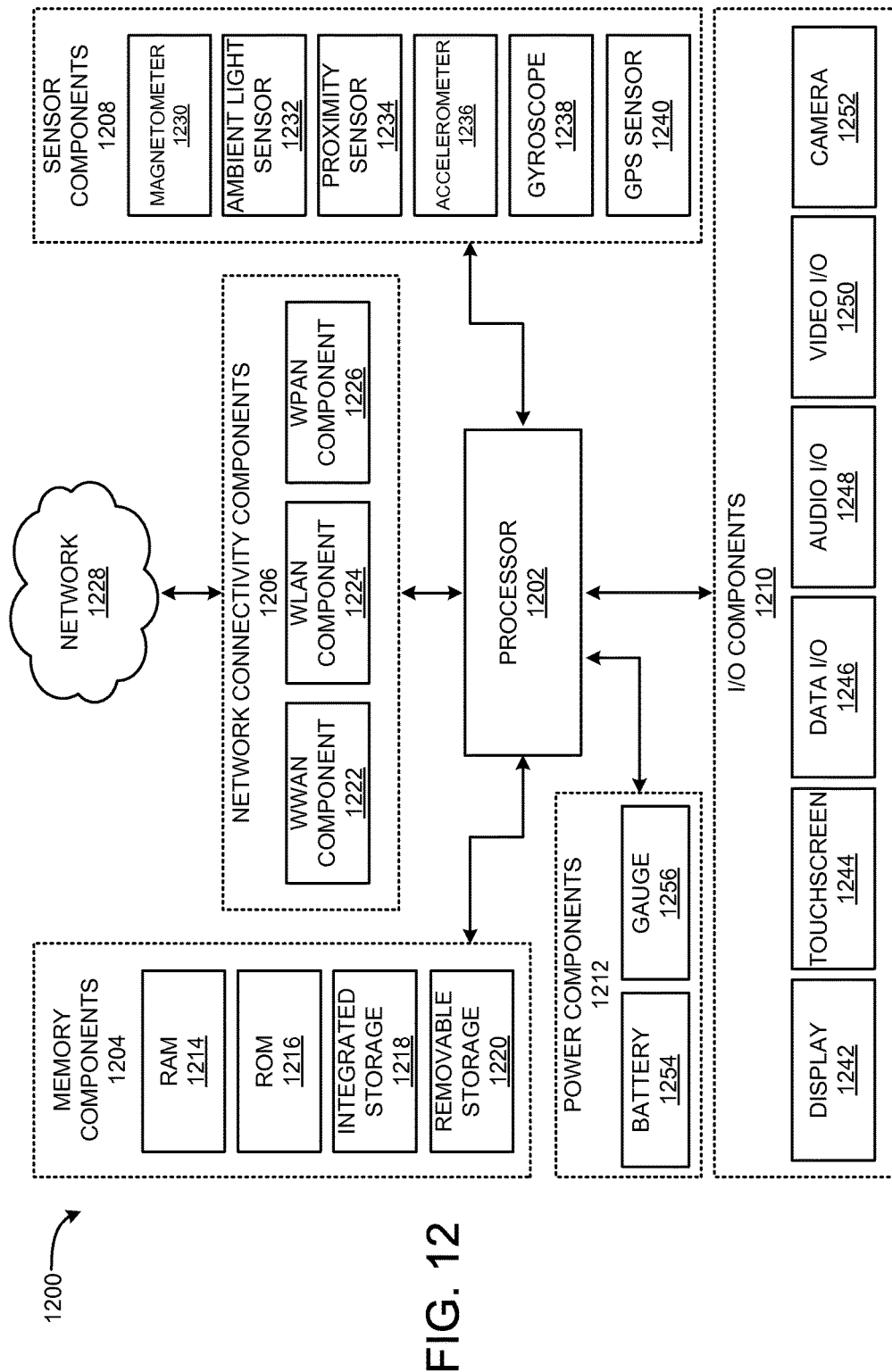
FIG. 12 is a computer architecture diagram illustrating a computing device architecture for another computing device that is capable of implementing aspects of the technologies presented herein.

Turning now to FIG. 12, an illustrative computing device architecture 1200 will be described for a computing device that is capable of executing the various software components described herein. The computing device architecture 1200 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 1200 is also applicable to any of the clients 1106 shown in FIG. 11. Furthermore, aspects of the computing device architecture 1200 are applicable to traditional desktop computers, portable computers (e.g., laptops, notebooks, ultra-portables, and netbooks), server computers, and other computer systems, such as those described herein with reference to FIG. 12. For example, the single touch and multi-touch aspects disclosed herein below can be applied to desktop computers that utilize a touchscreen or some other touch-enabled device, such as a touch-enabled track pad or touch-enabled mouse. The computing device architecture 1200 can also be utilized to implement the service client 306 for executing the application 304, and/or other types of computing devices for implementing or consuming the functionality described herein.

The computing device architecture 1200 illustrated in FIG. 12 includes a processor 1202, memory components 1204, network connectivity components 1206, sensor components 1208, input/output components 1210, and power components 1212. In the illustrated configuration, the processor 1202 is in communication with the memory components 1204, the network connectivity components 1206, the sensor components 1208, the input/output ("I/O") components 1210, and the power components 1212. Although no connections are shown between the individual components illustrated in FIG. 12, the components can be connected electrically in order to interact and carry out device functions. In some configurations, the components are arranged so as to communicate via one or more busses (not shown).

The processor 1202 includes one or more central processing unit ("CPU") cores configured to process data, execute computer-executable instructions of one or more application programs, such as the application 304, and to communicate with other components of the computing device architecture 1200 in order to perform aspects of the functionality described herein. The processor 1202 can be utilized to execute aspects of the software components presented herein and, particularly, those that utilize, at least in part, a touch-enabled input.

In some configurations, the processor 1202 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 1202 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 1202 is, or is included in, a system-on-chip ("SoC") along with one or more of the other components described herein below. For example, the SoC can include the processor 1202, a GPU, one or more of the network connectivity components 1206, and one or more of the sensor components 1208. In some configurations, the processor 1202 is fabricated, in part, utilizing a package-on-package ("PoP") integrated circuit packaging technique. Moreover, the processor 1202 can be a single core or multi-core processor.

The processor 1202 can be created in accordance with an ARM architecture, available for license from ARM HOLDINGS of Cambridge, United Kingdom. Alternatively, the processor 1202 can be created in accordance with an x86 architecture, such as is available from INTEL CORPORATION of Mountain View, Calif. and others. In some configurations, the processor 1202 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1204 include a RAM 1214, a ROM 1216, an integrated storage memory ("integrated storage") 1218, and a removable storage memory ("removable storage") 1220. In some configurations, the RAM 1214 or a portion thereof, the ROM 1216 or a portion thereof, and/or some combination of the RAM 1214 and the ROM 1216 is integrated in the processor 1202. In some configurations, the ROM 1216 is configured to store a firmware, an operating system or a portion thereof (e.g., operating system kernel), and/or a bootloader to load an operating system kernel from the integrated storage 1218 or the removable storage 1220.

The integrated storage 1218 can include a solid-state memory, a hard disk, or a combination of solid-state memory and a hard disk. The integrated storage 1218 can be soldered or otherwise connected to a logic board upon which the processor 1202 and other components described herein might also be connected. As such, the integrated storage 1218 is integrated into the computing device. The integrated storage 1218 can be configured to store an operating system or portions thereof, application programs, data, and other software components described herein.

The removable storage 1220 can include a solid-state memory, a hard disk, or a combination of solid-state memory and a hard disk. In some configurations, the removable storage 1220 is provided in lieu of the integrated storage 1218. In other configurations, the removable storage 1220 is provided as additional optional storage. In some configurations, the removable storage 1220 is logically combined with the integrated storage 1218 such that the total available storage is made available and shown to a user as a total combined capacity of the integrated storage 1218 and the removable storage 1220.

The removable storage 1220 is configured to be inserted into a removable storage memory slot (not shown) or other mechanism by which the removable storage 1220 is inserted and secured to facilitate a connection over which the removable storage 1220 can communicate with other components of the computing device, such as the processor 1202. The removable storage 1220 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1204 can store an operating system. According to various configurations, the operating system includes, but is not limited to, the WINDOWS MOBILE OS, the WINDOWS PHONE OS, or the WINDOWS OS from MICROSOFT CORPORATION, BLACKBERRY OS from RESEARCH IN MOTION, LTD. of Waterloo, Ontario, Canada, IOS from APPLE INC. of Cupertino, Calif., and ANDROID OS from GOOGLE, INC. of Mountain View, Calif. Other operating systems are contemplated.

The network connectivity components 1206 include a wireless wide area network component ("WWAN component") 1222, a wireless local area network component ("WLAN component") 1224, and a wireless personal area network component ("WPAN component") 1226. The network connectivity components 1206 facilitate communications to and from a network 1228, which can be a WWAN, a WLAN, or a WPAN. Although a single network 1228 is illustrated, the network connectivity components 1206 can facilitate simultaneous communication with multiple networks. For example, the network connectivity components 1206 can facilitate simultaneous communications with multiple networks via one or more of a WWAN, a WLAN, or a WPAN.

The network 1228 can be a WWAN, such as a mobile telecommunications network utilizing one or more mobile telecommunications technologies to provide voice and/or data services to a computing device utilizing the computing device architecture 1200 via the WWAN component 1222. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 1228 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1228 can be configured to provide voice and/or data communications with any combination of the above technologies. The network 1228 can be configured or adapted to provide voice and/or data communications in accordance with future generation technologies.

In some configurations, the WWAN component 1222 is configured to provide dual-multi-mode connectivity to the network 1228. For example, the WWAN component 1222 can be configured to provide connectivity to the network 1228, wherein the network 1228 provides service via GSM and UMTS technologies, or via some other combination of technologies. Alternatively, multiple WWAN components 1222 can be utilized to perform such functionality, and/or provide additional functionality to support other non-compatible technologies (i.e., incapable of being supported by a single WWAN component). The WWAN component 1222 can facilitate similar connectivity to multiple networks (e.g., a UMTS network and an LTE network).

The network 1228 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1224 is configured to connect to the network 1228 via the WI-FI access points. Such connections can be secured via various encryption technologies including, but not limited, WI-FI Protected Access ("WPA"), WPA2, Wired Equivalent Privacy ("WEP"), and the like.

The network 1228 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1226 is configured to facilitate communications with other devices, such as peripherals, computers, or other computing devices via the WPAN.

The sensor components 1208 include a magnetometer 1230, an ambient light sensor 1232, a proximity sensor 1234, an accelerometer 1236, a gyroscope 1238, and a Global Positioning System sensor ("GPS sensor") 1240. It is contemplated that other sensors, such as, but not limited to, temperature sensors or shock detection sensors, might also be incorporated in the computing device architecture 1200.

The magnetometer 1230 is configured to measure the strength and direction of a magnetic field. In some configurations the magnetometer 1230 provides measurements to a compass application program stored within one of the memory components 1204 in order to provide a user with accurate directions in a frame of reference including the cardinal directions, north, south, east, and west. Similar measurements can be provided to a navigation application program that includes a compass component. Other uses of measurements obtained by the magnetometer 1230 are contemplated.

The ambient light sensor 1232 is configured to measure ambient light. In some configurations, the ambient light sensor 1232 provides measurements to an application program, such as the application 304, stored within one of the memory components 1204 in order to automatically adjust the brightness of a display (described below) to compensate for low light and bright light environments. Other uses of measurements obtained by the ambient light sensor 1232 are contemplated.

The proximity sensor 1234 is configured to detect the presence of an object or thing in proximity to the computing device without direct contact. In some configurations, the proximity sensor 1234 detects the presence of a user's body (e.g., the user's face) and provides this information to an application program stored within one of the memory components 1204 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1234 are contemplated.

The accelerometer 1236 is configured to measure proper acceleration. In some configurations, output from the accelerometer 1236 is used by an application program as an input mechanism to control some functionality of the application program. In some configurations, output from the accelerometer 1236 is provided to an application program for use in switching between landscape and portrait modes, calculating coordinate acceleration, or detecting a fall. Other uses of the accelerometer 1236 are contemplated.

The gyroscope 1238 is configured to measure and maintain orientation. In some configurations, output from the gyroscope 1238 is used by an application program as an input mechanism to control some functionality of the application program. For example, the gyroscope 1238 can be used for accurate recognition of movement within a 3D environment of a video game application or some other application. In some configurations, an application program utilizes output from the gyroscope 1238 and the accelerometer 1236 to enhance control of some functionality of the application 304. Other uses of the gyroscope 1238 are contemplated.

The GPS sensor 1240 is configured to receive signals from GPS satellites for use in calculating a location. The location calculated by the GPS sensor 1240 can be used by any application program that requires or benefits from location information. For example, the location calculated by the GPS sensor 1240 can be used with a navigation application program to provide directions from the location to a destination or directions from the destination to the location. Moreover, the GPS sensor 1240 can be used to provide location information to an external location-based service, such as E911 service. The GPS sensor 1240 can obtain location information generated via WI-FI, WIMAX, and/or cellular triangulation techniques utilizing one or more of the network connectivity components 1206 to aid the GPS sensor 1240 in obtaining a location fix. The GPS sensor 1240 can also be used in Assisted GPS ("A-GPS") systems.

The I/O components 1210 include a display 1242, a touchscreen 1244, a data I/O interface component ("data I/O") 1246, an audio I/O interface component ("audio I/O") 1248, a video I/O interface component ("video I/O") 1250, and a camera 1252. In some configurations, the display 1242 and the touchscreen 1244 are combined. In some configurations two or more of the data I/O component 1246, the audio I/O component 1248, and the video I/O component 1250 are combined. The I/O components 1210 can include discrete processors configured to support the various interfaces described below, or might include processing functionality built-in to the processor 1202.

The display 1242 is an output device configured to present information in a visual form. In particular, the display 1242 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1242 is a liquid crystal display ("LCD") utilizing any active or passive matrix technology and any backlighting technology (if used). In some configurations, the display 1242 is an organic light emitting diode ("OLED") display. Other display types are contemplated.

The touchscreen 1244 is an input device configured to detect the presence and location of a touch. The touchscreen 1244 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1244 is incorporated on top of the display 1242 as a transparent layer to enable a user to use one or more touches to interact with objects or other information presented on the display 1242. In other configurations, the touchscreen 1244 is a touch pad incorporated on a surface of the computing device that does not include the display 1242. For example, the computing device can have a touchscreen incorporated on top of the display 1242 and a touch pad on a surface opposite the display 1242.

In some configurations, the touchscreen 1244 is a single-touch touchscreen. In other configurations, the touchscreen 1244 is a multi-touch touchscreen. In some configurations, the touchscreen 1244 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1244. As such, a developer can create gestures that are specific to a particular application program.

In some configurations, the touchscreen 1244 supports a tap gesture in which a user taps the touchscreen 1244 once on an item presented on the display 1242. The tap gesture can be used for various reasons including, but not limited to, opening or launching whatever the user taps, such as a graphical icon representing the application 304. In some configurations, the touchscreen 1244 supports a double tap gesture in which a user taps the touchscreen 1244 twice on an item presented on the display 1242. The double tap gesture can be used for various reasons including, but not limited to, zooming in or zooming out in stages. In some configurations, the touchscreen 1244 supports a tap and hold gesture in which a user taps the touchscreen 1244 and maintains contact for at least a pre-defined time. The tap and hold gesture can be used for various reasons including, but not limited to, opening a context-specific menu.

In some configurations, the touchscreen 1244 supports a pan gesture in which a user places a finger on the touchscreen 1244 and maintains contact with the touchscreen 1244 while moving the finger on the touchscreen 1244. The pan gesture can be used for various reasons including, but not limited to, moving through screens, images, or menus at a controlled rate. Multiple finger pan gestures are also contemplated. In some configurations, the touchscreen 1244 supports a flick gesture in which a user swipes a finger in the direction the user wants the screen to move. The flick gesture can be used for various reasons including, but not limited to, scrolling horizontally or vertically through menus or pages. In some configurations, the touchscreen 1244 supports a pinch and stretch gesture in which a user makes a pinching motion with two fingers (e.g., thumb and forefinger) on the touchscreen 1244 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 1244. As such, the above gestures should be understood as being illustrative and should not be construed as being limiting in any way.

The data I/O interface component 1246 is configured to facilitate input of data to the computing device and output of data from the computing device. In some configurations, the data I/O interface component 1246 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 1248 is configured to provide audio input and/or output capabilities to the computing device. In some configurations, the audio I/O interface component 1246 includes a microphone configured to collect audio signals. In some configurations, the audio I/O interface component 1248 includes a headphone jack configured to provide connectivity for headphones or other external speakers. In some configurations, the audio interface component 1248 includes a speaker for the output of audio signals. In some configurations, the audio I/O interface component 1248 includes an optical audio cable out.

The video I/O interface component 1250 is configured to provide video input and/or output capabilities to the computing device. In some configurations, the video I/O interface component 1250 includes a video connector configured to receive video as input from another device (e.g., a video media player such as a DVD or BLU-RAY player) or send video as output to another device (e.g., a monitor, a television, or some other external display). In some configurations, the video I/O interface component 1250 includes a High-Definition Multimedia Interface ("HDMI"), mini-HDMI, micro-HDMI, DisplayPort, or proprietary connector to input/output video content. In some configurations, the video I/O interface component 1250 or portions thereof is combined with the audio I/O interface component 1248 or portions thereof.

The camera 1252 can be configured to capture still images and/or video. The camera 1252 can utilize a charge coupled device ("CCD") or a complementary metal oxide semiconductor ("CMOS") image sensor to capture images. In some configurations, the camera 1252 includes a flash to aid in taking pictures in low-light environments. Settings for the camera 1252 can be implemented as hardware or software buttons.

Although not illustrated, one or more hardware buttons can also be included in the computing device architecture 1200. The hardware buttons can be used for controlling some operational aspect of the computing device. The hardware buttons can be dedicated buttons or multi-use buttons. The hardware buttons can be mechanical or sensor-based.

The illustrated power components 1212 include one or more batteries 1254, which can be connected to a battery gauge 1256. The batteries 1254 can be rechargeable or disposable. Rechargeable battery types include, but are not limited to, lithium polymer, lithium ion, nickel cadmium, and nickel metal hydride. Each of the batteries 1254 can be made of one or more cells.

The battery gauge 1256 can be configured to measure battery parameters such as current, voltage, and temperature. In some configurations, the battery gauge 1256 is configured to measure the effect of a battery's discharge rate, temperature, age and other factors to predict remaining life within a certain percentage of error. In some configurations, the battery gauge 1256 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1212 can also include a power connector (not shown), which can be combined with one or more of the aforementioned I/O components 1210. The power components 1212 can interface with an external power system or charging equipment via a power I/O component. Other configurations can also be utilized.

The disclosure presented herein also encompasses the subject matter set forth in the following clauses:

Clause 1. A computer-implemented method, comprising: receiving a request from a service client for a facet of a resource in a graph via a first network service application programming interface (API), the first network service API provided by way of a first network service operating in a first network; identifying a network address of a second network service API exposed by a second network service registered with the first network service to provide the facet; obtaining, by way of the first network service, data for use in authenticating with the second network service; and providing a response to the request received from the service client, the response comprising an instruction to the service client to perform a redirect to the network address of the second network service API exposed by the second network service to obtain the facet using the data for use in authenticating with the second network service.

Clause 2. The computer-implemented method of clause 1, wherein the request for the facet received from the service client comprises data identifying the resource and a unique identifier (ID) associated with the second network service.

Clause 3. The computer-implemented method of clauses 1-2, wherein the second network service is operating in a second network different from the first network, and wherein identifying the network address of the second network service API exposed by the second network service comprises utilizing the unique ID associated with the second network service to retrieve a previously stored callback uniform resource locator (URL) for the second network service.

Clause 4. The computer-implemented method of clauses 1-3, wherein the second network service registers with the first network service by providing the callback URL and the unique ID to the first network service.

Clause 5. The computer-implemented method of clauses 1-4, wherein identifying the network address of the second network service API exposed by the second network service comprises utilizing the unique ID associated with the second network service to obtain a uniform resource identifier (URI) template for the second network service; and resolving the URI template to generate the network address of the second network service API exposed by the second network service.

Clause 6. The computer-implemented method of clauses 1-5, wherein the second network service registers with the first network service by providing the URI template and the unique ID to the first network service.

Clause 7. The computer-implemented method of clauses 1-6, further comprising: receiving, by way of the first network service, a request for information about the facet, the request for information about the facet comprising a unique identifier (ID) associated with the second network service; utilizing the unique ID associated with the second network service to obtain the information about the facet; and returning the information about the facet in response to the request for information.

Clause 8. The computer-implemented method of clauses 1-7, further comprising: receiving, by way of the first network service, a request for data identifying facets associated with the resource in the graph, the request comprising data identifying a location of the resource in the graph; and returning the data identifying the facets associated with the resource in the graph in response to the request for data.

Clause 9. The computer-implemented method of clauses 1-8, wherein the first service is located in a first geographic location, wherein the second service is located in a second geographic location, and wherein the service client is located in a third geographic location.

Clause 10. An apparatus, comprising: one or more processors; and at least one computer storage medium having computer executable instructions stored thereon which, when executed by the one or more processors, cause the apparatus to receive a request from a service client for a facet of a resource in a graph via a first network service application programming interface (API) provided by way of a first network service operating in a first network, identify a network address of a second network service API exposed by a second network service registered with the first network service to provide the facet, and provide a response to the request received from the service client, the response comprising an instruction to the service client to perform a redirect to the network address of the second network service API exposed by the second network service to obtain the facet.

Clause 11. The apparatus of clause 10, wherein the request for the facet received from the service client comprises data identifying a location in the graph of the resource and a unique identifier (ID) associated with the second network service, and wherein identifying the network address of the second network service API exposed by the second network service comprises utilizing the unique ID associated with the second network service to retrieve a previously stored callback uniform resource locator (URL) for the second network service.

Clause 12. The apparatus of clauses 10-11, wherein the second network service registers with the first network service by providing the callback URL and the unique ID to the first network service.

Clause 13. The apparatus of clauses 10-12, wherein the request for the facet received from the service client comprises data identifying a location in the graph of the resource and a unique identifier (ID) associated with second network service, and wherein identifying the network address of the second network service API exposed by the second network service comprises: utilizing the unique ID associated with the second network service to obtain a uniform resource identifier (URI) template for the second network service; and resolving the URI template to generate the network address of the second network service API exposed by the second network service.

Clause 14. The apparatus of clauses 10-13, wherein the second network service registers with the first network service by providing the URI template and the unique ID to the first network service.

Clause 15. The apparatus of clauses 10-14, wherein the first service is further configured to: transmit a request to the second network service for the facet, the request comprising the authentication token for the second network service; receive the facet from the second network service; and provide a reply to the request for the facet to the service client comprising the facet and additional information for the resource in the graph obtained from one or more other network services operating within the first network.

Clause 16. A computer-readable storage medium having computer executable instructions stored thereon which, when executed by one or more processors, cause the processors to: receive a request from a service client for a facet of a resource in a graph via a first network service application programming interface (API) provided by way of a first network service operating in a first network; identify a network address of a second network service API exposed by a second network service registered with the first network service to provide the facet; and provide a response to the request received from the service client, the response comprising an instruction to the service client to perform a redirect to the network address of the second network service API exposed by the second network service to obtain the facet.

Clause 17. The computer-readable storage medium of clauses 16, wherein the request for the facet received from the service client comprises data identifying a location in the graph of the resource and a unique identifier (ID) associated with the second network service, and wherein identifying the network address of the second network service API exposed by the second network service comprises utilizing the unique ID associated with the second network service to retrieve a previously stored callback uniform resource locator (URL) for the second network service.

Clause 18. The computer-readable storage medium of clauses 16-17, wherein the second network service registers with the first network service by providing the callback URL and the unique ID to the first network service.

Clause 19. The computer-readable storage medium of clauses 16-18, wherein the request for the facet received from the service client comprises data identifying a location in the graph of the resource and a unique identifier (ID) associated with second network service, and wherein identifying the network address of the second network service API exposed by the second network service comprises: utilizing the unique ID associated with the second network service to obtain a uniform resource identifier (URI) template for the second network service; and resolving the URI template to generate the network address of the second network service API exposed by the second network service.

Clause 20. The computer-readable storage medium of clauses 16-19, wherein the second network service registers with the first network service by providing the URI template and the unique ID to the first network service.

Based on the foregoing, it should be appreciated that various technologies for extending a federated graph with third-party data or metadata have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for integrating a first network service with a second network service, comprising:
   sending a set of resource data from a resource in a computer-readable property graph to a service client via a first network service operating in a first network, with the graph being a collection of computer-readable content in a computer system, with the first network service being a federated graph provider service, and with the sending of the set of resource data being performed as part of a unified response to a single request submitted via a first network service application programming interface (API) provided by way of the first network service, with the unified response to the single request comprising data from multiple different federated computerized data providers, with the unified response comprising the set of resource data;
   receiving a facet request from the service client for a facet of the resource in the graph via the first network service API, with the facet comprising additional data beyond the set of resource data sent to the service client via the first network service, with a registration of a second network service with the first network service to provide the facet occurring prior to the receiving of the facet request, and with the registration comprising the facet being associated with the resource in the graph through data or metadata associated with the first network service and a second network service;

identifying a network address of a second network service API exposed by the second network service;

obtaining, by way of the first network service, an authentication token for use in authenticating with the second network service; and providing a response to the facet request received from the service client, the response comprising the authentication token and an instruction to the service client to perform a redirect to the network address of the second network service API exposed by the second network service to obtain the facet using the authentication token to authenticate with the second network service.

2. The computer-implemented method of claim 1, wherein the facet request comprises data identifying the resource and a unique identifier (ID) associated with the second network service.

3. The computer-implemented method of claim 2, wherein the second network service is operating in a second network different from the first network, and wherein identifying the network address of the second network service API exposed by the second network service comprises utilizing the unique ID associated with the second network service to retrieve a previously stored callback uniform resource locator (URL) for the second network service.

4. The computer-implemented method of claim 3, wherein the second network service registers with the first network service by providing the callback URL and the unique ID to the first network service.

5. The computer-implemented method of claim 2, wherein identifying the network address of the second network service API exposed by the second network service comprises:

utilizing the unique ID associated with the second network service to obtain a uniform resource identifier (URI) template for the second network service; and resolving the URI template to generate the network address of the second network service API exposed by the second network service.

6. The computer-implemented method of claim 5, wherein the second network service registers with the first network service by providing the URI template and the unique ID to the first network service.

7. The computer-implemented method of claim 1, further comprising:

receiving, by way of the first network service, a request for information about the facet, the request for information about the facet comprising a unique identifier (ID) associated with the second network service;

utilizing the unique ID associated with the second network service to obtain the information about the facet; and returning the information about the facet in response to the request for information.

8. The computer-implemented method of claim 1, further comprising:

receiving, by way of the first network service, a request for data identifying facets associated with the resource in the graph, the request for data comprising data identifying a location of the resource in the graph; and returning the data identifying the facets associated with the resource in the graph in response to the request for data.

9. The computer-implemented method of claim 1, wherein the first network service is located in a first geographic location, wherein the second network service is located in a second geographic location, and wherein the service client is located in a third geographic location.

10. An apparatus, comprising:

one or more processors; and at least one computer storage medium having computer executable instructions stored thereon which, when executed by the one or more processors, cause the apparatus to perform acts for integrating a first network service with a second network service, with the acts comprising:

sending a set of resource data from a resource in a computer-readable property graph to a service client via a first network service operating in a first network, with the graph being a collection of computer-readable content in a computer system, with the first network service being a federated graph provider service, and with the sending of the set of resource data being performed as part of a unified response to a single request submitted via a first network service application programming interface (API) provided by way of the first network service, with the unified response to the single request comprising data from multiple different federated computerized data providers, with the unified response comprising the set of resource data;

receiving a facet request from the service client for a facet of the resource in the graph via the first network service API, with the facet comprising additional data beyond the set of resource data sent to the service client via the first network service, with a registration of a second network service with the first network service to provide the facet occurring prior to the receiving of the facet request, and with the registration comprising the facet being associated with the resource in the graph through data or metadata associated with the first network service and a second network service;

identifying a network address of a second network service API exposed by the second network service, obtaining, by way of the first network service, an authentication token for use in authenticating with the second network service, and providing a response to the facet request received from the service client, the response comprising the authentication token and an instruction to the service client to perform a redirect to the network address of the second network service API exposed by the second network service to obtain the facet using the authentication token to authenticate with the second network service.

11. The apparatus of claim 10, wherein the facet request comprises data identifying a location in the graph of the resource and a unique identifier (ID) associated with the second network service, and wherein identifying the network address of the second network service API exposed by the second network service comprises utilizing the unique ID associated with the second network service to retrieve a previously stored callback uniform resource locator (URL) for the second network service.

12. The apparatus of claim 11, wherein the acts comprise the second network service registering with the first network service by providing the callback URL and the unique ID to the first network service.

13. The apparatus of claim 10, wherein the facet request comprises data identifying a location in the graph of the resource and a unique identifier (ID) associated with second network service, and wherein identifying the network address of the second network service API exposed by the second network service comprises:
   utilizing the unique ID associated with the second network service to obtain a uniform resource identifier (URI) template for the second network service; and
   resolving the URI template to generate the network address of the second network service API exposed by the second network service.

14. The apparatus of claim 13, wherein the acts comprise the second network service registering with the first network service by providing the URI template and the unique ID to the first network service.

15. The apparatus of claim 10, wherein the facet request is a first facet request and the first network service is further configured to:
   transmit a second facet request to the second network service for the facet, the second facet request comprising the authentication token for the second network service;
   receive the facet from the second network service; and
   provide a reply to the second facet request for the facet to the service client comprising the facet and additional information for the resource in the graph obtained from one or more other network services operating within the first network.

16. A computer-readable storage medium having computer executable instructions stored thereon which, when executed by one or more processors, cause the processors to perform acts for integrating a first network service with a second network service, with the acts comprising:
   sending a set of resource data from a resource in a computer-readable property graph to a service client via a first network service operating in a first network, with the graph being a collection of computer-readable content in a computer system, with the first network service being a federated graph provider service, and with the sending of the set of resource data being performed as part of a unified response to a single request submitted via a first network service application programming interface (API) provided by way of the first network service, with the unified response to the single request comprising data from multiple different federated computerized data providers, with the unified response comprising the set of resource data;
   receiving a facet request from the service client for a facet of the resource in the graph via the first network service API, with the facet comprising additional data beyond the set of resource data sent to the service client via the first network service, with a registration of a second network service with the first network service to provide the facet occurring prior to the receiving of the facet request, and with the registration comprising the facet being associated with the resource in the graph through data or metadata associated with the first network service and a second network service;
   identifying a network address of a second network service API exposed by the second network service;
   obtaining, by way of the first network service, an authentication token for use in authenticating with the second network service; and
   providing a response to the facet request received from the service client, the response comprising an authentication token and an instruction to the service client to perform a redirect to the network address of the second network service API exposed by the second network service to obtain the facet using the authentication token to authenticate with the second network service.

17. The computer-readable storage medium of claim 16, wherein the facet request comprises data identifying a location in the graph of the resource and a unique identifier (ID) associated with the second network service, and wherein identifying the network address of the second network service API exposed by the second network service comprises utilizing the unique ID associated with the second network service to retrieve a previously stored callback uniform resource locator (URL) for the second network service.

18. The computer-readable storage medium of claim 17, wherein the acts comprise the second network service registering with the first network service by providing the callback URL and the unique ID to the first network service.

19. The computer-readable storage medium of claim 16, wherein the facet request comprises data identifying a location in the graph of the resource and a unique identifier (ID) associated with second network service, and wherein identifying the network address of the second network service API exposed by the second network service comprises:
   utilizing the unique ID associated with the second network service to obtain a uniform resource identifier (URI) template for the second network service; and
   resolving the URI template to generate the network address of the second network service API exposed by the second network service.

20. The computer-readable storage medium of claim 19, wherein the acts comprise the second network service registering with the first network service by providing the URI template and the unique ID to the first network service.

* * * * *